United States Patent
Sako

(10) Patent No.: US 8,289,408 B2
(45) Date of Patent: Oct. 16, 2012

(54) IMAGING SYSTEM, IMAGING INSTRUCTION ISSUING APPARATUS, IMAGING APPARATUS, AND IMAGING METHOD

(75) Inventor: Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 12/218,487

(22) Filed: Jul. 15, 2008

(65) Prior Publication Data

US 2009/0021591 A1    Jan. 22, 2009

(30) Foreign Application Priority Data

Jul. 18, 2007    (JP) ................................. 2007-186967

(51) Int. Cl.
*H04N 5/232* (2006.01)
(52) U.S. Cl. ................. 348/211.2; 348/211.99
(58) Field of Classification Search .................... 348/47, 348/48, 50, 73, 211.11; 396/56, 310
See application file for complete search history.

(56) References Cited

U.S. PATENT DOCUMENTS

| | | | |
|---|---|---|---|
| 6,591,068 B1 * | 7/2003 | Dietz | 396/429 |
| 6,628,899 B1 | 9/2003 | Kito | |
| 6,909,457 B1 * | 6/2005 | Fukasawa | 348/211.11 |
| 7,139,018 B2 * | 11/2006 | Grosvenor et al. | 348/211.3 |
| 7,205,958 B2 * | 4/2007 | Yamazaki | 345/1.1 |
| 7,460,781 B2 * | 12/2008 | Kanai et al. | 396/263 |
| 7,639,279 B2 * | 12/2009 | Shinohara et al. | 348/211.3 |
| 2002/0135682 A1 * | 9/2002 | Oka et al. | 348/211.3 |
| 2003/0021591 A1 | 1/2003 | Grosvenor et al. | |
| 2003/0023967 A1 | 1/2003 | Kim | |
| 2003/0133018 A1 * | 7/2003 | Ziemkowski | 348/211.2 |
| 2004/0183915 A1 * | 9/2004 | Gotohda et al. | 348/207.11 |
| 2005/0093986 A1 * | 5/2005 | Shinohara et al. | 348/208.1 |
| 2005/0134696 A1 * | 6/2005 | Nath et al. | 348/211.9 |
| 2005/0174470 A1 | 8/2005 | Yamasaki | |
| 2005/0277405 A1 * | 12/2005 | Noguchi | 455/411 |
| 2006/0013576 A1 | 1/2006 | Sauder | |
| 2006/0028558 A1 * | 2/2006 | Sato et al. | 348/211.99 |
| 2006/0056832 A1 * | 3/2006 | Yamaguchi et al. | 396/56 |
| 2007/0285339 A1 * | 12/2007 | Yamazaki | 345/1.1 |
| 2008/0239081 A1 | 10/2008 | Helbing | |
| 2008/0244675 A1 | 10/2008 | Sako et al. | |

FOREIGN PATENT DOCUMENTS

CN    1710843 A    12/2005

(Continued)

*Primary Examiner* — John Villecco
*Assistant Examiner* — Selam Gebriel
(74) *Attorney, Agent, or Firm* — Wolf, Greenfield & Sacks, P.C.

(57) ABSTRACT

An imaging system includes an imaging instruction issuing apparatus and one or more imaging apparatuses. The imaging instruction issuing apparatus includes a generation unit that generates notification data including identification information unique to each imaging instruction issuing apparatus and an imaging request signal, and a first communication unit that transmits and outputs the notification data to each imaging apparatus. Each imaging apparatus includes an imaging unit that obtains captured image data of a subject, a saving unit that saves the captured image data obtained by the imaging unit, a second communication unit that receives the notification data from the imaging instruction issuing apparatus, and a control unit that causes the saving unit to save the captured image data and the identification information included in the notification data in an associated manner in a case where the notification data received by the second communication unit includes the imaging request signal.

16 Claims, 16 Drawing Sheets

FOREIGN PATENT DOCUMENTS

| | | |
|---|---|---|
| EP | 1 725 010 A2 | 11/2006 |
| JP | 04-307657 A | 10/1992 |
| JP | 2000-023015 A | 1/2000 |
| JP | 2003-110999 A | 4/2003 |
| JP | 2004-320441 A | 11/2004 |
| JP | 2005-136632 A | 5/2005 |
| JP | 2005-303511 A | 10/2005 |
| JP | 2006-245641 A | 9/2006 |
| JP | 2006-254145 A | 9/2006 |
| JP | 2006-319876 A | 11/2006 |
| JP | 2007-018218 A | 1/2007 |
| JP | 2007-028130 A | 2/2007 |
| JP | 2007-173992 A | 7/2007 |
| WO | WO 03/050608 A2 | 6/2003 |
| WO | WO 2005/032144 A1 | 4/2005 |

\* cited by examiner

FIG. 1
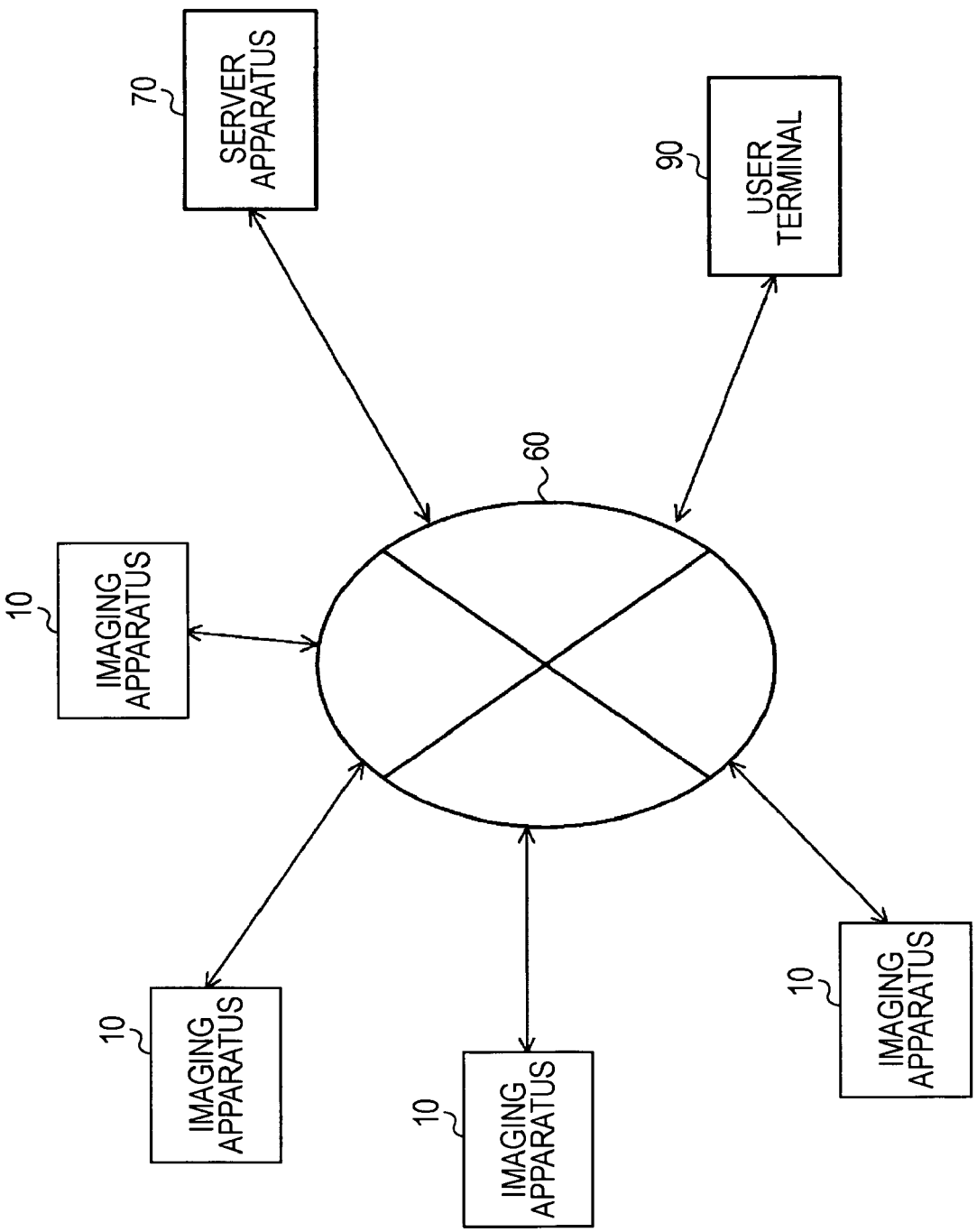
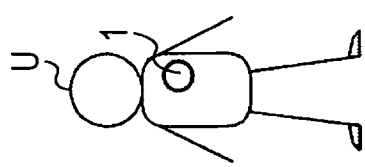

FIG. 11

| USER ID | (ENCRYPTED) CAPTURED IMAGE DATA |
|---------|--------------------------------|
| UID 1   | K (PIC#1)                      |
| UID 1   | K (PIC#2)                      |
| UID 2   | K (PIC#3)                      |
| UID 3   | K (PIC#4)                      |
| ⋮       | ⋮                              |

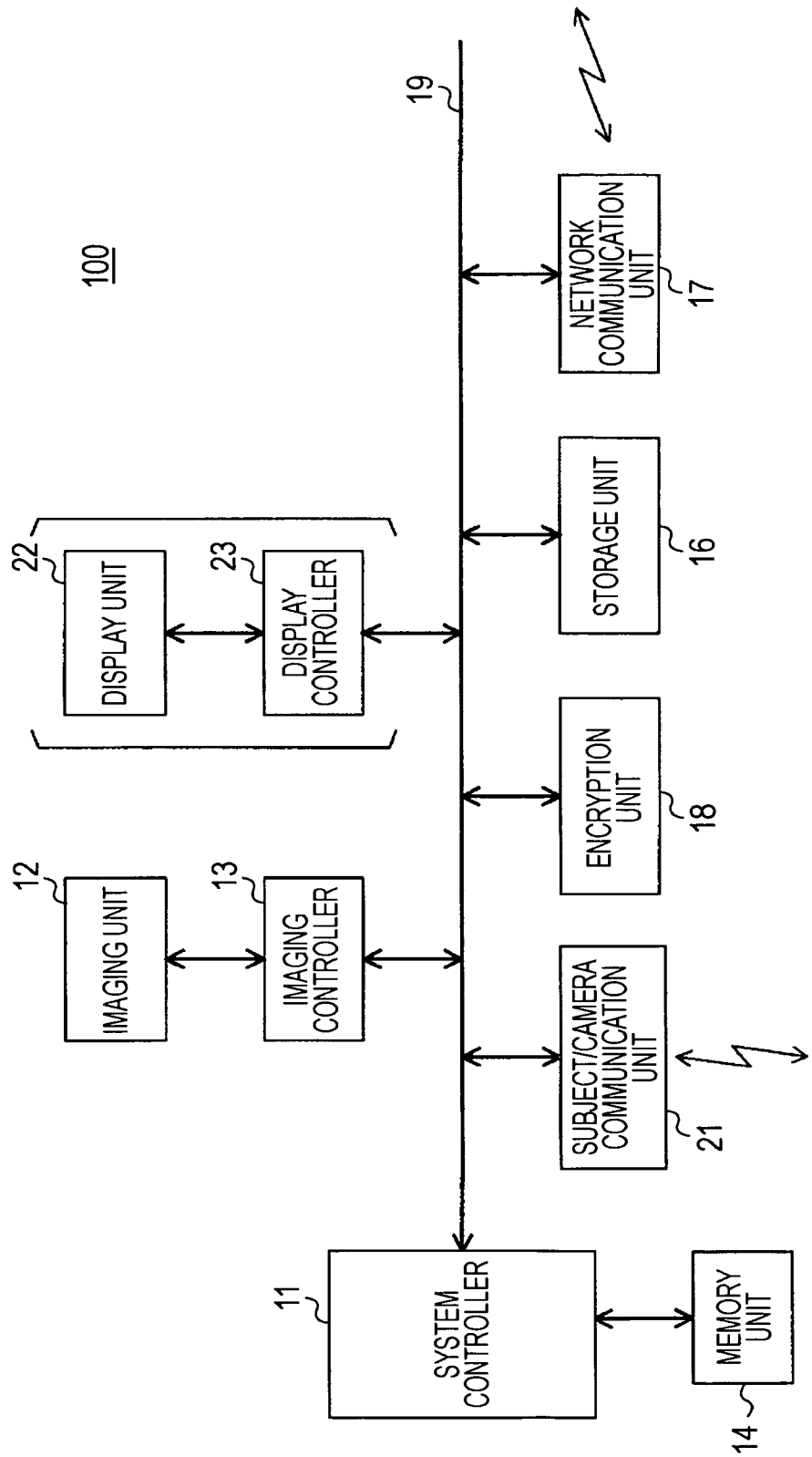

IMAGING SYSTEM, IMAGING INSTRUCTION ISSUING APPARATUS, IMAGING APPARATUS, AND IMAGING METHOD

CROSS REFERENCES TO RELATED APPLICATIONS

The present invention contains subject matter related to Japanese Patent Application JP 2007-186967 filed in the Japanese Patent Office on Jul. 18, 2007, the entire contents of which are incorporated herein by reference.

BACKGROUND OF THE INVENTION

1. Field of the Invention

The present invention relates to an imaging instruction issuing apparatus, an imaging apparatus, an imaging system including the same, and an imaging method.

2. Description of the Related Art

Cameras, such as life-log cameras and life-slice cameras, which are worn by users and continuously capture a moving image or periodically capture still images to record image data of landscapes viewed by the users in everyday life have been proposed. One example of these cameras is described in Japanese Unexamined Patent Application Publication No. 2004-320441.

By using a life-log camera, a user can have image data of the user's action log and memories. In general, however, when a user wears a life-log camera and the life-log camera captures images, images of landscapes viewed by the user can be captured, but no images of the user are captured.

Image data serving as a life log of a user is expected to include images of the user.

Besides serving as a user's action log, image data is expected to include images of the user captured in many places.

SUMMARY OF THE INVENTION

It is desirable to provide an imaging system in which images are captured by an imaging apparatus that is not carried by a user in accordance with the user's movement and actions and to enable, for example, a user who wants to have images serving as a life log or an action log to easily obtain the user's captured image data.

According to an embodiment of the present invention, there is provided an imaging system including an imaging instruction issuing apparatus and one or more imaging apparatuses. The imaging instruction issuing apparatus includes generation means for generating notification data including identification information unique to each imaging instruction issuing apparatus and an imaging request signal, and first communication means for transmitting and outputting the notification data to the one or more imaging apparatuses. The one or more imaging apparatuses each include imaging means for obtaining captured image data of a subject, saving means for performing a saving process of saving the captured image data obtained by the imaging means, second communication means for receiving the notification data from the imaging instruction issuing apparatus, and control means for causing the saving means to perform a saving process of saving the captured image data obtained by the imaging means and the identification information included in the notification data in an associated manner in a case where the notification data received by the second communication means includes the imaging request signal.

The imaging system may further include a server apparatus. The one or more imaging apparatuses each may include third communication means for performing data communication with the server apparatus, and the control means may control the third communication means to transmit the saved captured image data and identification information to the server apparatus. The server apparatus may include fourth communication means for performing data communication with the one or more imaging apparatuses, storage means for storing data, and server control means for causing, when the fourth communication means receives the captured image data and the identification information from the one or more imaging apparatuses, the storage means to store the captured image data and the identification information.

According to another embodiment of the present invention, there is provided an imaging instruction issuing apparatus including generation means for generating notification data including unique identification information and an imaging request signal or notification data including an imaging prohibition signal, and first communication means for transmitting and outputting the notification data to an external imaging apparatus.

The imaging instruction issuing apparatus may further include position detecting means for detecting current position information. The generation means may generate the notification data additionally including the position information detected by the position detecting means.

The generation means may generate the notification data additionally including information used for encryption performed by the external imaging apparatus.

The first communication means may transmit and output the notification data at a transmission timing at periodical or irregular intervals.

The first communication means may transmit and output the notification data to the external imaging apparatus upon receipt of a query signal from the external imaging apparatus.

The first communication means may be a wireless optical communication unit.

According to another embodiment of the present invention, there is provided an imaging apparatus including imaging means for obtaining captured image data of a subject, saving means for performing a saving process of saving the captured image data obtained by the imaging means, second communication means for receiving notification data from an external imaging instruction issuing apparatus, and control means for causing, in a case where the notification data received by the second communication means includes an imaging request signal and identification information of the imaging instruction issuing apparatus serving as a transmission source of the notification data, the saving means to perform a saving process of saving the captured image data obtained by the imaging means and the identification information included in the notification data in an associated manner.

The imaging apparatus may further include third communication means for performing data communication with an external server apparatus. The control means may control the third communication means to transmit the saved captured image data and identification information to the server apparatus.

The imaging means may include a charge-coupled device sensor or a complementary metal-oxide semiconductor sensor serving as an image pickup device.

The second communication means may be a wireless optical communication unit.

The control means may cause, in a case where the notification data received by the second communication means includes the imaging request signal and the identification information of the imaging instruction issuing apparatus serving as the transmission source of the notification data, the saving means to save the captured image data obtained by the imaging means and to save the identification information in association with the captured image data.

Alternatively, the control means may cause the saving means to save the captured image data representing a continuous moving image or periodical still images and, as the saving process performed in the case where the notification data received by the second communication means includes the imaging request signal and the identification information of the imaging instruction issuing apparatus serving as the transmission source of the notification data, may perform marking control of a point of the saved captured image data corresponding to the identification information.

The control means may perform a setting to prohibit the saving process of saving the captured image data in a case where the notification data received by the second communication means includes an imaging prohibition signal.

The control means may recognize a position of the subject on the basis of position information included in the notification data received by the second communication means.

The imaging apparatus may further include encryption means for performing an encryption process of encrypting the captured image data obtained by the imaging means using information used for encryption, the information being included in the notification data received by the second communication means.

According to another embodiment of the present invention, there is provided an imaging method including the steps of receiving notification data from an external imaging instruction issuing apparatus, and, in a case where the notification data includes an imaging request signal and identification information of the imaging instruction issuing apparatus serving as a transmission source of the notification data, performing a saving process of saving captured image data obtained by performing an imaging operation and the identification information included in the notification data in an associated manner.

The imaging method may further include the step of transmitting the saved captured image data and identification information to an external server apparatus.

According to the embodiments of the present invention, the following operation is performed. A user who wants to have the user's image data captured wears an imaging instruction issuing apparatus.

One or more imaging apparatuses are assumed to be camera devices provided in many places. The camera devices may be owned publicly or privately. Further, the camera devices may be carried or worn by others.

The imaging instruction issuing apparatus transmits and outputs notification data including identification data (user ID) unique to the imaging instruction issuing apparatus and an imaging request signal. When the user in everyday life wearing the imaging instruction issuing apparatus comes to a place where an imaging apparatus is provided, the notification data is received by the imaging apparatus. The imaging apparatus checks the imaging request signal in the notification data and performs a saving process of saving captured image data. At the same time, the imaging apparatus additionally saves the identification information of the imaging instruction issuing apparatus in association with the captured image data.

That is, when a user wears or carries the imaging instruction issuing apparatus, images of the user are captured by imaging apparatuses provided in many places (or carried or worn by others), and captured image data is saved together with identification information.

At a later time, the user can obtain the captured image data on the basis of the identification information. For example, each imaging apparatus uploads the saved captured image data and identification information to a server apparatus. In response to a request from the user, the server apparatus can extract the captured image data on the basis of the identification information. The captured image data extracted on the basis of the identification information is captured image data of the user, and the captured image data is presented to the user.

According to the embodiments of the present invention, images of a user wearing or carrying an imaging instruction issuing apparatus are automatically captured by an imaging apparatus. Accordingly, for example, when a user who wants to have the user's images captured as a life log or an action log wears or carries the imaging instruction issuing apparatus, the user can cause the imaging apparatus to capture images of the user. Captured image data can be obtained from a server apparatus.

Therefore, an imaging system in which images are captured by an imaging apparatus that is not carried by a user in accordance with the user's movement and actions can be realized. For the user, images of the user can be easily obtained without actively intending to have the user's images captured.

BRIEF DESCRIPTION OF THE DRAWINGS

FIG. 1 is a diagram illustrating an imaging system according to an embodiment of the present invention;

FIG. 11 is a table illustrating the storage status of captured image data in the server apparatus according to the embodiment;

FIG. 16 is a block diagram of the imaging and imaging-instruction-issuing apparatus according to the embodiment.

DESCRIPTION OF THE PREFERRED EMBODIMENTS

Figure 2:
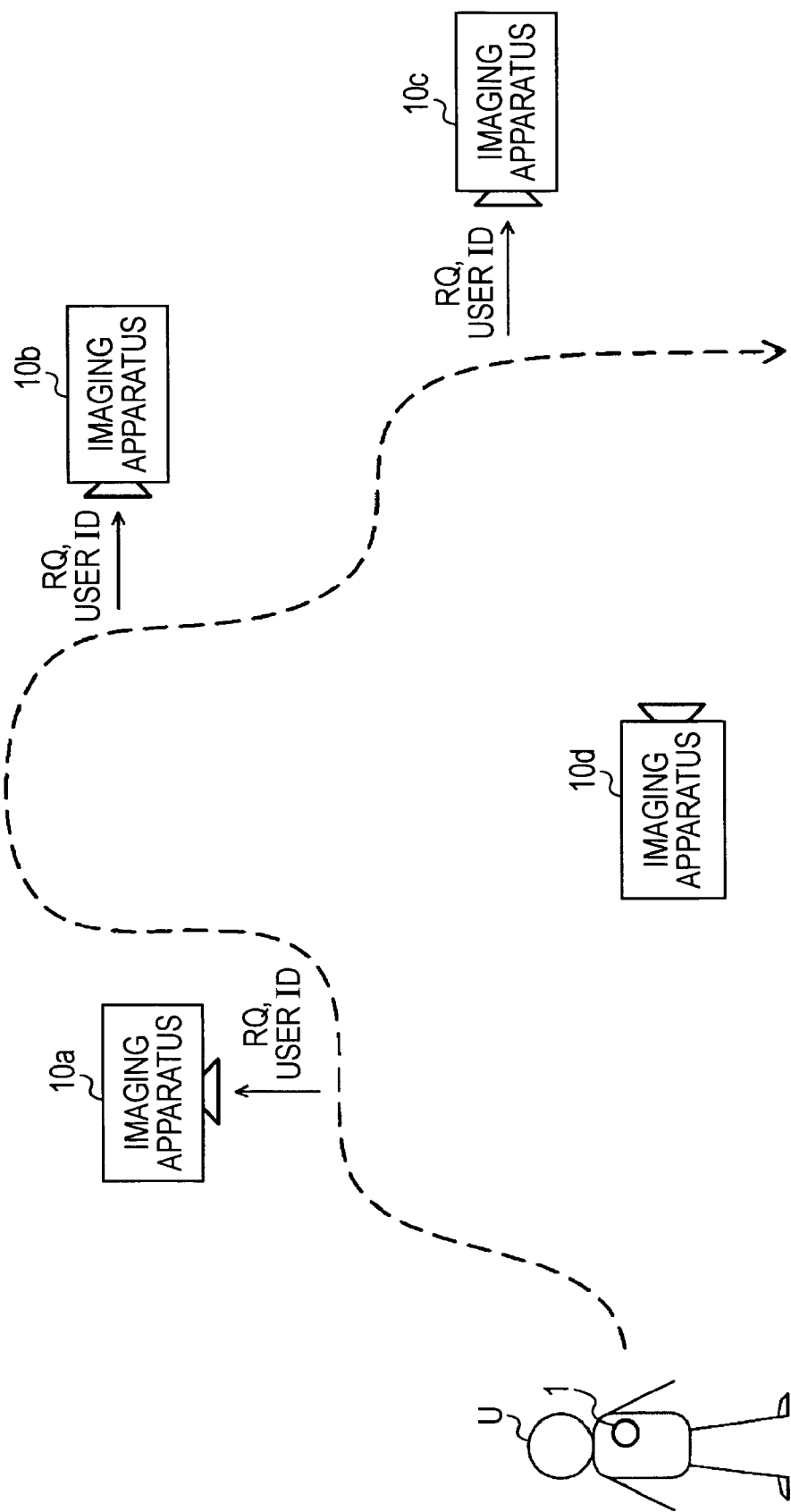
FIG. 2 is a diagram illustrating the operation of the imaging system according to the embodiment.

An imaging system, an imaging instruction issuing apparatus, an imaging apparatus, and an imaging method according to embodiments of the present invention will be described below. The descriptions are given in the following order:
1. Outline of System Configuration and Operation
2. Structure of Imaging Instruction Issuing Apparatus, Imaging Apparatus, and Server Apparatus
3. Exemplary Processes Performed by Imaging Instruction Issuing Apparatus, Imaging Apparatus, Server Apparatus, and User Terminal
4. Another Exemplary Process (Marking Process) Performed by Imaging Apparatus
5. Another Exemplary Process (Prohibition Code Corresponding Process) Performed by Imaging Apparatus
6. Actual Examples of Wearable Device
7. Advantages and Modifications of Embodiments
1. Outline of System Configuration and Operation FIG. 1 illustrates the outline of an imaging system according to an embodiment of the present invention.

A user U who wants to have his or her images captured using the imaging system wears an imaging instruction issuing apparatus 1. The imaging instruction issuing apparatus 1 is, for example, a badge-type small apparatus that can be attached to clothing worn by a user. Other various types of the imaging instruction issuing apparatus 1 are conceivable.

For example, the imaging instruction issuing apparatus 1 can be formed as a hairpin type, a hair accessory type, an earring type, a necklace type, a broach type, a bracelet type, a watch type, a glasses type, a tie pin type, an arm band type, or a ring type, and a user can wear the imaging instruction issuing apparatus 1 in a manner according to each type. Alternatively, the imaging instruction issuing apparatus 1 can be formed as an apparatus that can be attached to an existing product such as glasses, sun glasses, an accessory, a hat, a cap, or headphones.

Further, the imaging instruction issuing apparatus 1 can simply be a small apparatus suitable for being carried by a user. In this way, the user U can have the imaging instruction issuing apparatus 1 in the user's pocket or bag and carry the imaging instruction issuing apparatus 1. That is, the imaging instruction issuing apparatus 1 is not limited to any particular form. The imaging instruction issuing apparatus 1 can have any form as long as it can be worn or carried by a person.

The imaging system of this example includes many imaging apparatuses 10. The imaging apparatuses 10 can communicate with the imaging instruction issuing apparatus 1 by performing wireless communication using light or radio waves. The imaging apparatuses 10 each have a network communication function and can communicate with a server apparatus 70 via a network 60.

The imaging apparatuses 10 may be owned publicly or privately. For example, the imaging apparatuses 10 of this example may include public apparatuses provided in any public places such as inside and outside public facilities, inside and outside stores, stations, inside trains, streets, and intersections. Further, the imaging apparatuses 10 of this example may include private apparatuses such as digital still cameras and camcorders owned by people other than the user U. Further, the imaging apparatuses 10 of this example may include cameras provided in the home of the user U.

Various types of the network 60 are conceivable, including the Internet, mobile phone communication networks, personal handy phone (PHS) communication networks, ad-hoc networks, and local area networks (LANs).

By performing communication via the network 60, the server apparatus 70 receives upload data from each of the imaging apparatuses 10 and stores the received upload data. Upload data is, as will be described later, data at least including captured image data obtained using each of the imaging apparatuses 10 and identification information (hereinafter referred to as a "user ID") uniquely given to each imaging instruction issuing apparatus 1.

The server apparatus 70 stores various items of captured image data and can show these items of data to the public on a website or the like.

A user terminal 90 is, for example, a network communication terminal owned by the user U. The user terminal 90 is a device that can connect to the server apparatus 70 by performing communication via the network 60. Examples of the user terminal 90 include a personal computer, a personal digital assistant (PDA), and a mobile phone owned by the user U.

For example, the following operation is performed in the foregoing system configuration.

Referring to FIG. 2, it is assumed that imaging apparatuses 10a, 10b, 10c, and 10d (hereinafter collectively referred to as an "imaging apparatus 10") are camera devices provided in places of an area where the user U is. It is also assumed that the user U wearing the imaging instruction issuing apparatus 1 moves along broken lines.

The imaging instruction issuing apparatus 1 periodically transmits and outputs camera notification data including an image capturing request code RQ and a user ID. Alternatively, the imaging instruction issuing apparatus 1 may output camera notification data including an image capturing request code RQ and a user ID in response to a query signal sent from the imaging apparatus 10.

When the user U comes to in front of the imaging apparatus 10a, the imaging apparatus 10a receives the camera notification data including the image capturing request code RQ and the user ID sent from the imaging instruction issuing apparatus 1. By recognizing the image capturing request code RQ, the imaging apparatus 10a saves captured image data obtained by capturing an image. Here, the user ID is associated with the captured image data. In this case, the saved captured image data is the image of the user U.

Thereafter, when the user U comes to in front of the imaging apparatus 10b, the imaging apparatus 10b similarly receives the camera notification data including the image capturing request code RQ and the user ID. By recognizing the image capturing request code RQ, the imaging apparatus 10b saves, together with the user ID, captured image data obtained by capturing an image.

Thereafter, when the user U comes to in front of the imaging apparatus 10c, the imaging apparatus 10c similarly receives the camera notification data including the image capturing request code RQ and the user ID. By recognizing the image capturing request code RQ, the imaging apparatus 10c saves, together with the user ID, captured image data obtained by capturing an image.

In this manner, when the user U moves in everyday life and comes to in front of the imaging apparatus 10, the imaging apparatus 10 captures an image in response to the image capturing request code RQ and saves the image including the user U (image that is highly likely to include the user U).

By performing communication via the network 60, each of the imaging apparatuses 10a, 10b, and 10c shown in FIG. 2 uploads the captured image data saved in association with the user ID to the server apparatus 70 immediately after having captured the image or at a later time.

The server apparatus 70 stores the captured image data uploaded from each of the imaging apparatuses 10a, 10b, and 10c and the user ID. Accordingly, the captured image data of the user U is stored in association with the user ID in the server apparatus 70.

Using the user terminal 90, the user U accesses the server apparatus 70 (for example, a website provided by the server apparatus 70). In this case, the user can cause the server apparatus 70 to extract captured image data of the user by transmitting the user ID to the server apparatus 70. The extracted captured image data is downloaded to the user terminal 90. Accordingly, the user U can obtain the captured image data which has been captured in accordance with the movement and actions of the user U.

When the server apparatus 70 shows captured image data stored therein to general users on a website or the like, images of the user U are made public to people other than the user U. In order to overcome this inconvenience, preferably, for example, the captured image data stored in the server apparatus 70 may be encrypted, and the user U who accesses the server apparatus 70 may be allowed to view and download the images by going through an authentication process using the user ID, password, etc. and a decryption process.

For example, the imaging instruction issuing apparatus 1 transmits a password set by the user U, together with the image capturing request code RQ and the user ID, to the imaging apparatus 10. The imaging apparatus 10 generates an encryption key on the basis of the password, encrypts the captured image data using the encryption key, and uploads the encrypted captured image data to the server apparatus 70.

When accessing the server apparatus 70 from the user terminal 90, the user U logs in to the server apparatus 70 using the user ID and the password. In this state, the server apparatus 70 extracts the captured image data to be presented to the user U on the basis of the user ID, performs a decryption process using the encryption key based on the password, and presents the images to the user U. The user U can obtain the captured image data by requesting a download of all or selected images of the presented images.

By performing the foregoing processes, images of each user are not unconditionally presented to the public.

2. Structure of Imaging Instruction Issuing Apparatus, Imaging Apparatus, and Server Apparatus Exemplary structures of the imaging instruction issuing apparatus 1, the imaging apparatus 10, and the server apparatus 70 of this example are described.

Figure 3:
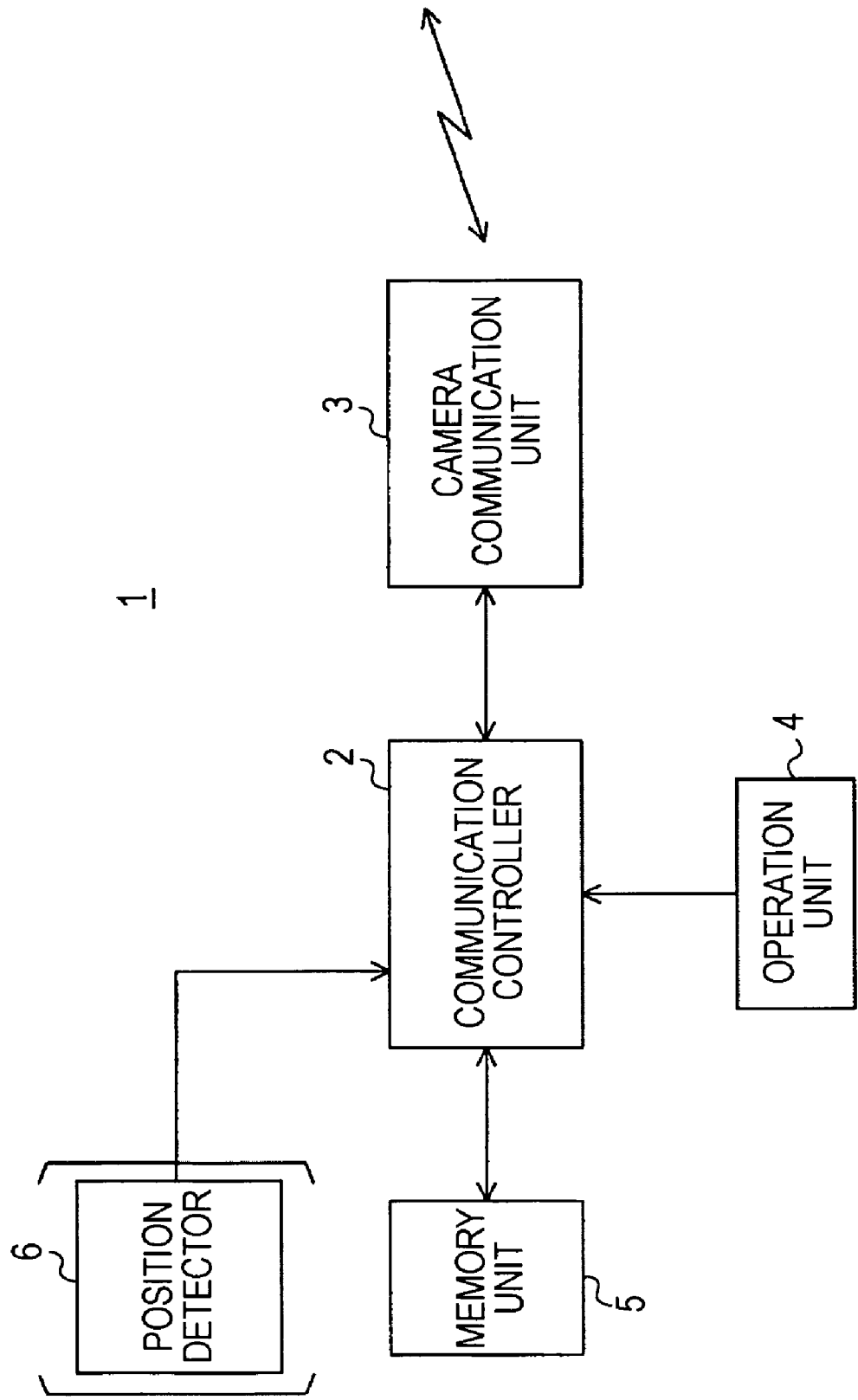
FIG. 3 is a block diagram of an imaging instruction issuing apparatus according to the embodiment.

Referring to FIG. 3, the exemplary structure of the imaging instruction issuing apparatus 1 is described. As has been described above, it is assumed that the imaging instruction issuing apparatus 1 is a small apparatus that can be worn or carried by a user. The imaging instruction issuing apparatus 1 includes, for example, a communication controller 2, a camera communication unit 3, an operation unit 4, and a memory unit 5. The imaging instruction issuing apparatus 1 may further include a position detector 6.

The imaging instruction issuing apparatus 1 is an apparatus that transmits camera notification data to the imaging apparatus 10.

The communication controller 2 includes, for example, a central processing unit (CPU). The communication controller 2 performs a process for transmitting camera notification data.

The memory unit 5 includes storage areas such as a read-only memory (ROM), a random access memory (RAM), and a non-volatile memory. The memory unit 5 is used as a storage area for a processing program executed by the communication controller 2 and a work area. The memory unit 5 may be an internal memory of a microcomputer chip serving as the communication controller 2.

The non-volatile memory area of the memory unit 5 stores, for example, items of identification information (user IDs) uniquely given to individual imaging instruction issuing apparatuses 1 and information based on entered user operations. Information based on entered user operations include, for example, setting information for requesting or prohibiting capturing of images, which is sent as details of camera notification data, and a password entered by a user as an arbitrary number.

The operation unit 4 is an operation unit with which a user can issue an instruction to request or prohibit capturing of images, which is sent as details of camera notification data, or enter a password. In this example, a password is used to generate an encryption key for encrypting and decrypting data in the imaging apparatus 10 and the server apparatus 70.

The camera communication unit 3 is a communication unit that transmits and outputs notification data to the imaging apparatus 10. The camera communication unit 3 performs communication with an instruction-issuing-apparatus communication unit 15 of the imaging apparatus 10, which will be described later. Any communication protocol that enables the camera communication unit 3 and the instruction-issuing-apparatus communication unit 15 to wirelessly communicate with each other at a relatively short distance can be used. For example, a short distance wireless communication protocol, such as Bluetooth, may be employed. Alternatively, an optical communication protocol for performing data communication based on optical pulse modulation using visible light or invisible light may be employed.

The position detector 6 is, for example, a Global Positioning System (GPS) receiver. The GPS receiver receives radio waves sent from GPS satellites and obtains latitude and longitude information serving as the current position. In particular, it is preferable that the position detector 6 can obtain position information with an accuracy of about tenths of a second, seconds, minutes, and degrees as position information for specifying the position with an accuracy of one to about a few meters.

The position detector 6 may employ wireless fidelity (WiFi) or a position information service provided by a mobile phone company. Alternatively, the position detector 6 may employ a combination of WiFi, the position information service, and GPS.

As will be described later, in the imaging instruction issuing apparatus 1, the camera communication unit 3 periodically transmits camera notification data. Alternatively, the camera communication unit 3 transmits camera notification data in response to a query signal sent from the imaging apparatus 10.

For example, when a user makes an image capturing request to set the imaging apparatus 10 to capture an image, the communication controller 2 generates camera notification data including a user ID and an image capturing request code RQ, and the camera communication unit 3 transmits the generated camera notification data. When the imaging instruction issuing apparatus 1 includes the position detector 6, the camera notification data additionally includes position information.

In contrast, when the user wants to prohibit capturing of the user's images using the imaging apparatus 10 and sets and prohibits the imaging apparatus 10 from capturing images, the communication controller 2 generates camera notification data including an image capturing prohibition code NP, and the camera communication unit 3 transmits the generated camera notification data. When the imaging instruction issuing apparatus 1 includes the position detector 6, the camera notification data may also include position information.

The foregoing operations are described later.

Figure 4:
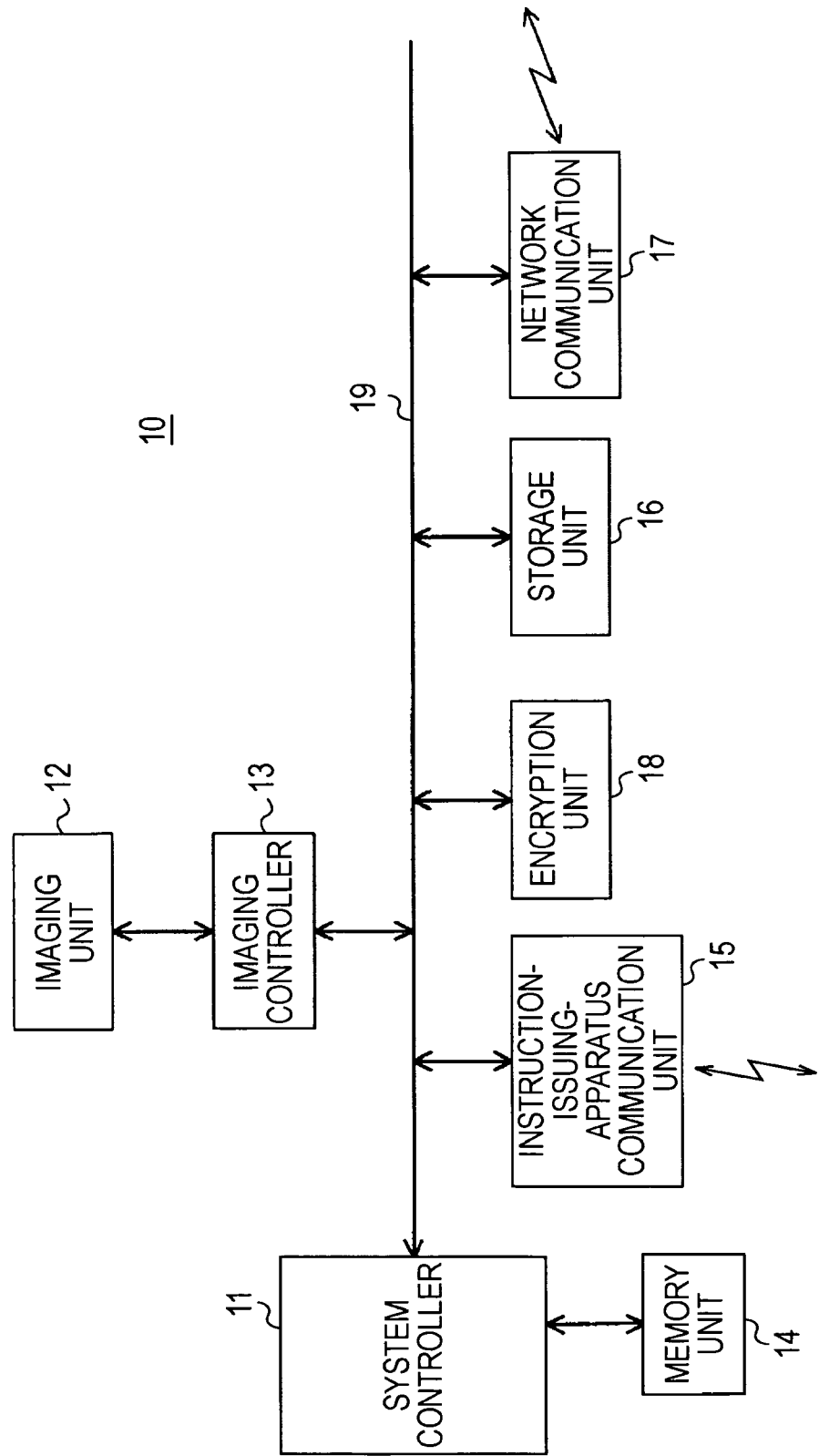
FIG. 4 is a block diagram of an imaging apparatus according to the embodiment.

Referring now to FIG. 4, the exemplary structure of the imaging apparatus 10 is described.

A system controller 11 includes, for example, a CPU. The system controller 11 functions as a controller that controls the entire imaging apparatus 10. That is, on the basis of operation programs, the system controller 11 performs various arithmetic operations, exchanges control signals with other parts via a bus 19, and causes the other parts to perform necessary operations.

A memory unit 14 has memory areas including a ROM, a RAM, and a non-volatile memory and is used by the system controller 11. For example, the ROM area and the non-volatile memory area of the memory unit 14 store operation programs executed by the system controller 11 and fixed operation parameters. The RAM area is used as a work area for arithmetic operations performed by the system controller 11 and a storage area for storing the details of camera notification data when the camera notification data is received from the imaging instruction issuing apparatus 1.

The memory unit 14 may be an internal memory of the system controller 11 which is a microcomputer chip.

An imaging unit 12 includes an imaging optical system, an image pickup device, and an image-pickup-signal processing unit.

The imaging optical system in the imaging unit 12 includes a lens system including an imaging lens, an aperture, a zoom lens, and a focus lens, a drive system for causing the lens system to perform a focus operation and a zoom operation, and the like.

In the image pickup device in the imaging unit 12, an array of solid-stage image pickup elements for detecting imaging light obtained by the imaging optical system and generating image pickup signals by performing photoelectric conversion is provided. The array of solid-stage image pickup elements is, for example, a charge-coupled device (CCD) sensor array or a complementary metal-oxide semiconductor (CMOS) sensor array.

The image-pickup-signal processing unit in the imaging unit 12 includes a sample-hold circuit and an automatic gain control (AGC) circuit for performing gain adjustment and waveform shaping of signals obtained by the solid-stage image pickup elements and a video analog-to-digital (A/D) converter for obtaining captured image data as digital data. The image-pickup-signal processing unit applies white balance processing, luminance processing, color signal processing, and blur correction processing to the captured image data.

With the imaging unit 12 including the imaging optical system, the image pickup device, and the image-pickup-signal processing unit, an image is captured, and captured image data is obtained.

Image data obtained by performing an image capturing operation using the imaging unit 12 is processed by an imaging controller 13.

Under control of the system controller 11, the imaging controller 13 performs a process of converting captured image data into a predetermined image data format and a process of supplying the converted captured image data to a storage unit 16, a network communication unit 17, an encryption unit 18, etc. in accordance with an operating state.

On the basis of an instruction issued by the system controller 11, the imaging controller 13 controls switching on and off the image capturing operation of the imaging unit 12, driving of the zoom lens and the focus lens in the imaging optical system, the sensitivity and frame rate of the image pickup device, and parameters of processes performed by the image-pickup-signal processing unit and sets processes to be executed.

The instruction-issuing-apparatus communication unit 15 performs data communication with the camera communication unit 3 of the imaging instruction issuing apparatus 1 described above. Therefore, the instruction-issuing-apparatus communication unit 15 performs communication according to a wireless communication protocol common to the camera communication unit 3.

The encryption unit 18 is an encryption processor that applies an encryption process to captured image data. For example, the encryption unit 18 uses an encryption key and encrypts captured image data transferred from the imaging controller 13 or read from the storage unit 16.

The encryption key is generated by performing, for example, a predetermined generation algorithm operation using the foregoing password. Alternatively, the password itself may serve as the encryption key.

Under control of the system controller 11, the storage unit 16 records (saves) captured image data. The storage unit 16 records, together with the captured image data, a user ID transmitted from the imaging instruction issuing apparatus 1 in association with the captured image data.

Under control of the system controller 11, the recorded captured image data and the like are read from the storage unit 16.

The storage unit 16 may include a fixed memory, such as a RAM or a flash memory, or, for example, a hard disk drive (HDD).

Alternatively, the storage unit 16 may be, instead of a built-in recording medium, a read/write drive corresponding to a portable recording medium, such as a memory card, an optical disk, a magneto-optical disk, and a hologram memory including a built-in fixed memory.

The storage unit 16 may include both a built-in memory, such as a fixed memory or an HDD, and a read/write drive corresponding to a portable recording medium.

The network communication unit 17 performs data transmission/reception with an external communication device. In particular, the network communication unit 17 performs data communication with the server apparatus 70, which is communication performed via the network 60 shown in FIG. 1. The network communication unit 17 can be of any type as long as it is connected to a network and performs wired or wireless communication.

Figure 5:
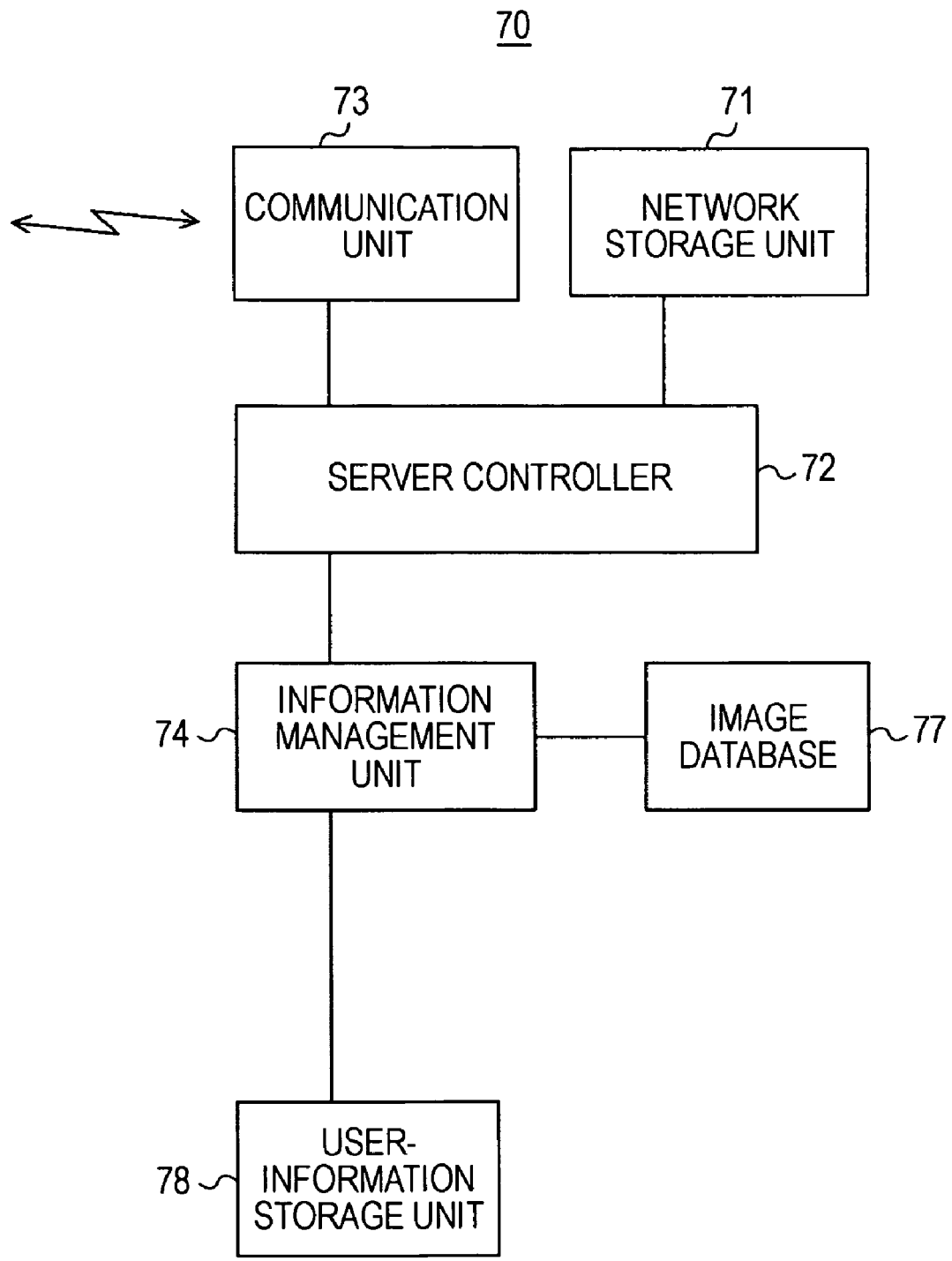
FIG. 5 is a block diagram of a server apparatus according to the embodiment.

Referring now to FIG. 5, the exemplary structure of the server apparatus 70 is illustrated.

As has been described above, the server apparatus 70 is an apparatus that stores, for example, captured image data uploaded from the imaging apparatus 10 and downloads the captured image data to the user terminal 90 or the like by performing communication via the network 60.

The server apparatus 70 includes a server controller 72, a network storage unit 71, a communication unit 73, an information management unit 74, an image database 77, and a user-information storage unit 78.

The server controller 72 performs operation control necessary for the server apparatus 70. In particular, the server controller 72 controls a network communication operation, a process of uploading captured image data from the imaging apparatus 10, and a process of downloading the captured image data to the user terminal 90 and manages a network website.

The network storage unit 71 is implemented by, for example, an HDD and is used to temporarily save data (upload data and download data) transmitted/received by performing communication with the imaging apparatus 10 and the user terminal 90 via the network 60 and to save website images.

The communication unit 73 performs data communication with the network communication unit 17 of the imaging apparatus 10 and a communication unit of the user terminal 90 via the network 60.

The information management unit 74 manages captured image data uploaded from the imaging apparatus 10, a user ID, and the like.

The image database 77 stores, for example, captured image data uploaded from the imaging apparatus 10 and a user ID in an associated manner in a database.

The user-information storage unit 78 stores registered information of a user of the imaging instruction issuing apparatus 1 to which image data is provided from the server apparatus 70. For example, the user-information storage unit 78 manages user IDs, which are items of identification information given to individual imaging instruction issuing apparatuses 1, passwords (arbitrary passwords set by users and registered in the server apparatus 70) corresponding to the user IDs, and the like.

The structures of the imaging instruction issuing apparatus 1, the imaging apparatus 10, and the server apparatus 70 have been described above. However, these structures are only examples. Various elements can be added to or deleted from the structures in accordance with the actually performed exemplary operations and functions.

3. Exemplary Processes Performed by Imaging Instruction Issuing Apparatus, Imaging Apparatus, Server Apparatus, and User Terminal Exemplary processes performed by the imaging instruction issuing apparatus 1, the imaging apparatus 10, the server apparatus 70, and the user terminal 90 are described.

Figure 6:
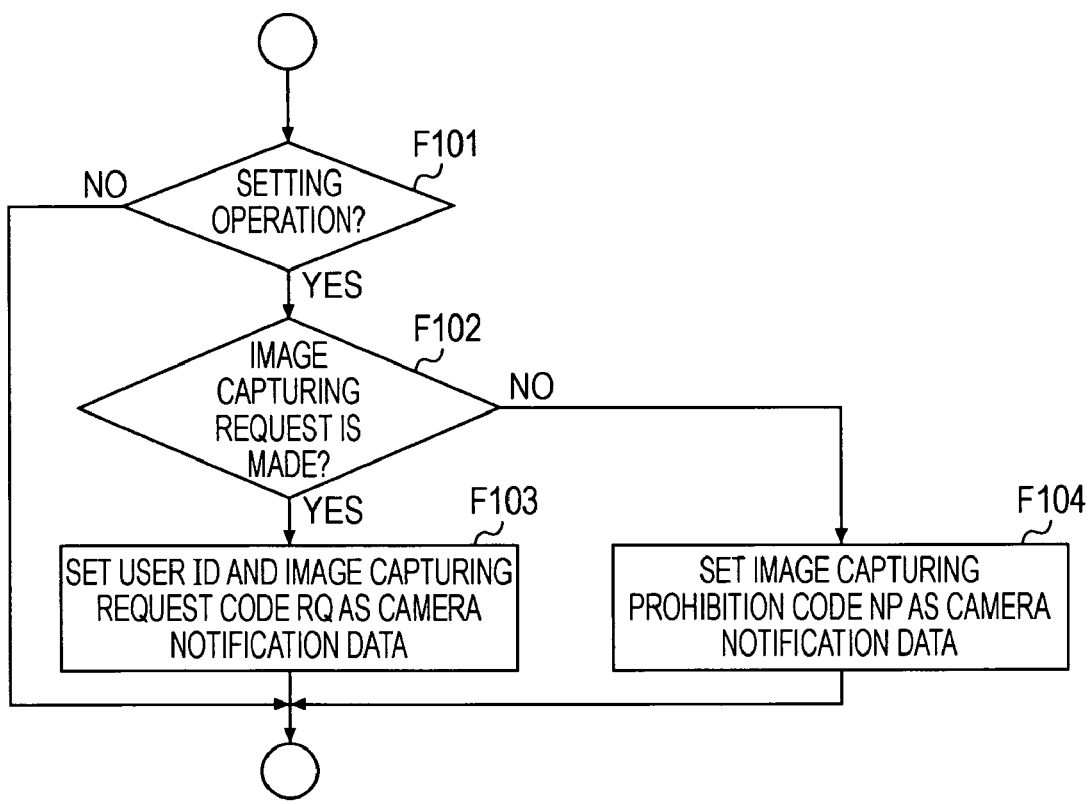
FIG. 6 is a flowchart of a setting process performed by the imaging instruction issuing apparatus according to the embodiment.

FIG. 6 illustrates a process performed by the communication controller 2 of the imaging instruction issuing apparatus 1 in accordance with a setting operation entered by the user U when the user U uses the imaging instruction issuing apparatus 1.

As has been described with reference to FIGS. 1 and 2, the user U wears the imaging instruction issuing apparatus 1 and moves, and this causes the imaging apparatus 10 to capture images of the user U. Therefore, for example, when wearing the imaging instruction issuing apparatus 1, the user sets in advance the imaging instruction issuing apparatus 1 to transmit and output an image capturing request code RQ. Alternatively, the user U can set the imaging instruction issuing apparatus 1 to transmit and output an image capturing prohibition code NP for actively prohibiting capturing of images.

In order to make an image capturing request or to prohibit capturing of images, the user uses the operation unit 4 to enter a setting operation.

When the user enters a setting operation, the communication controller 2 of the imaging instruction issuing apparatus 1 performs the process shown in FIG. 6.

Upon detection that the entered setting operation is an image capturing request or prohibition, the communication controller 2 proceeds from step F101 to F102, and the process is branched according to the details of the user operation.

When the user operation is a setting operation to make an image capturing request, the process proceeds to step F103 and sets a user ID and an image capturing request code RQ as details to be included in camera notification data.

In contrast, when the user operation is a setting operation to prohibit capturing of images, the process proceeds to step F104 and sets an image capturing prohibition code NP as details to be included in camera notification data.

By performing the foregoing setting process, from this point onward, the imaging instruction issuing apparatus 1 transmits and outputs the camera notification data including the image capturing request code RQ or the image capturing prohibition code NP serving as a code based on the user's intention.

Figure 7A:
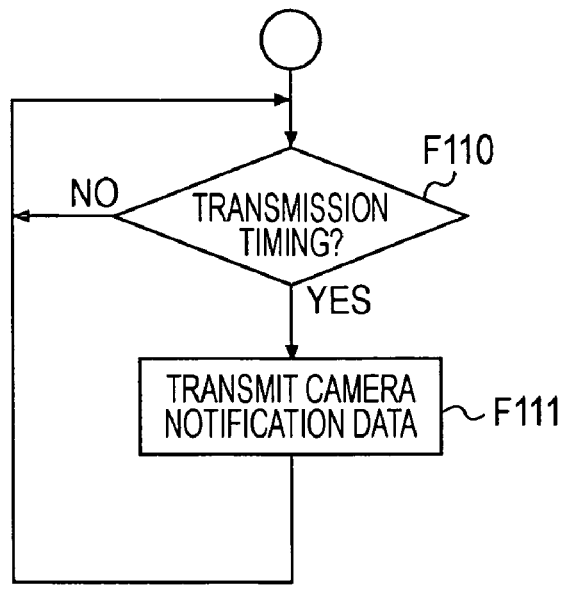
FIGS. 7A and 7B are flowcharts of camera notification data transmitting processes performed by the imaging instruction issuing apparatus according to the embodiment.
Figure 7B:
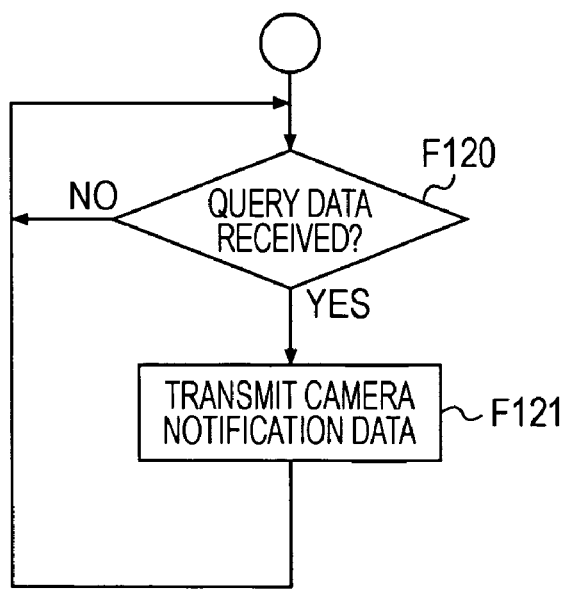
Figure 8A:
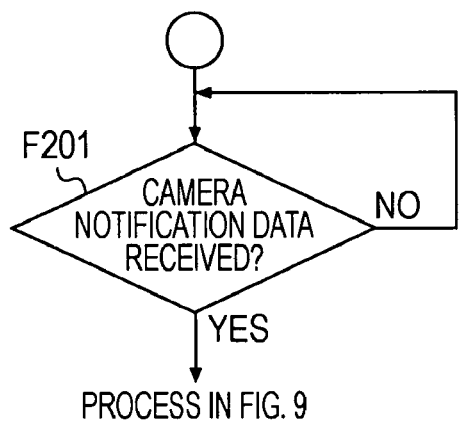
FIGS. 8A and 8B are flowcharts of camera notification data receiving processes performed by the imaging apparatus according to the embodiment.
Figure 8B:
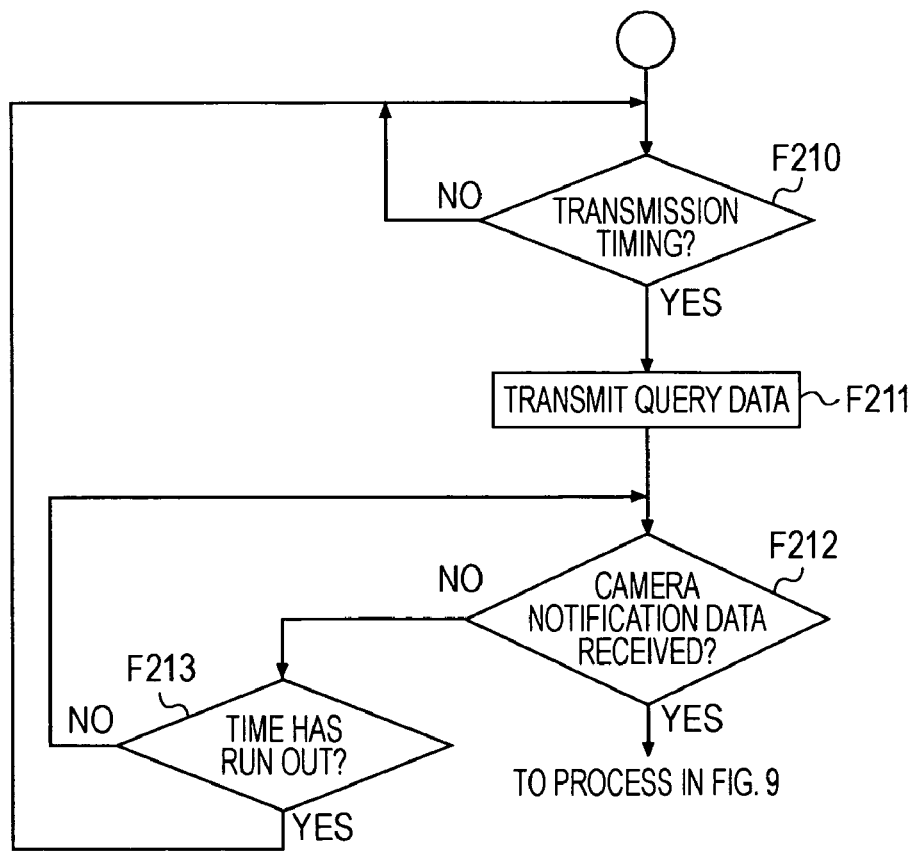

FIGS. 7A, 7B, 8A, and 8B illustrate exemplary communication processes performed by the imaging instruction issuing apparatus 1 and the imaging apparatus 10. FIGS. 7A and 7B illustrate control processes performed by the communication controller 2, which relate to communication performed by the camera communication unit 3 of the imaging instruction issuing apparatus 1. FIGS. 8A and 8B illustrate control processes performed by the system controller 11, which relate to communication performed by the instruction-issuing-apparatus communication unit 15 of the imaging apparatus 10.

An exemplary communication operation performed in FIGS. 7A and 8A is described.

The communication controller 2 of the imaging instruction issuing apparatus 1 causes, for example, camera notification data to be periodically transmitted. That is, in step F110 of FIG. 7A, the communication controller 2 determines whether a transmission timing which is a periodical timing has been reached. When the transmission timing has been reached, in step F111, the communication controller 2 causes the camera communication unit 3 to transmit camera notification data. That is, the communication controller 2 supplies camera notification data including the details set in the foregoing setting process shown in FIG. 6 to the camera communication unit 3, and causes the camera communication unit 3 to modulate the camera notification data for communication and to transmit and output the camera notification data.

In this case, the communication controller 2 constantly counts time and causes the camera communication unit 3 to transmit and output the camera notification data at a periodical timing, such as every two seconds or every few tens of seconds. However, the transmission timing can be irregular, rather than periodical. The irregular timing may include a timing at which a certain trigger, such as a user operation, is made.

In step F111, the communication controller 2 supplies camera notification data to the camera communication unit 3. When the foregoing setting process shown in FIG. 6 has made an image capturing request, the details of the camera notification data include data including an image capturing request RQ and a user ID. When the user has preliminarily entered and set a password, the communication controller 2 also includes the password in the camera notification data. Further, when the imaging instruction issuing apparatus 1 includes the position detector 6, position information detected at that point is additionally included in the camera notification data.

In contrast, when the setting process has prohibited capturing of images, camera notification data at least includes data including an image capturing prohibition code NP. When the imaging instruction issuing apparatus 1 includes the position detector 6, position information detected at that point may additionally be included in the camera notification data.

With the process shown in FIG. 7A, camera notification data is transmitted and output from the imaging instruction issuing apparatus 1 on, for example, a periodical basis. In this case, as the user U moves along the broken lines shown in FIG. 2, the imaging apparatus 10 to which the user U has come close receives the camera notification data. Upon receipt of the camera notification data as shown in FIG. 8A, the imaging apparatus 10 starts a process shown in FIG. 9, which will be described later.

That is, in the example shown in FIGS. 7A and 8A, the imaging instruction issuing apparatus 1 transmits camera notification data on a substantially constant basis. Upon receipt of the camera notification data, the imaging apparatus 10 executes the corresponding process shown in FIG. 9, which will be described later.

In contrast, communication processes shown in FIGS. 7B and 8B are also conceivable.

As shown in FIG. 7B, the communication controller 2 of the imaging instruction issuing apparatus 1 checks in step F120 whether query data sent from the imaging apparatus 10 has been received by the camera communication unit 3. When the query data has been received, the process proceeds to step F121, and the communication controller 2 supplies camera notification data to the camera communication unit 3 and causes the camera communication unit 3 to modulate the camera notification data for communication and to transmit and output the camera notification data.

On the imaging apparatus 10 side, the system controller 11 constantly performs the process shown in FIG. 8B. For example, the system controller 11 determines in step F210 whether a periodical transmission timing has been reached on the basis of the time count. When the transmission timing has been reached, the process proceeds to step F211, and the system controller 11 causes the instruction-issuing-apparatus communication unit 15 to transmit and output query data.

When the query data is transmitted from the instruction-issuing-apparatus communication unit 15, the system controller 11 starts counting time serving as a standby time, determines in step F212 whether camera notification data has been received, and determines in step F213 whether the time has run out.

That is, the system controller 11 waits for camera notification data for a predetermined time. When camera notification data is received before the time runs out, the system controller 11 starts the process shown in FIG. 9, which will be described later. In contrast, when the time runs out, the flow returns to step F210.

When the user U wearing the imaging instruction issuing apparatus 1 is in the vicinity of the imaging apparatus 10, the camera communication unit 3 of the imaging instruction issuing apparatus 1 receives query data. Accordingly, the imaging instruction issuing apparatus 1 transmits camera notification data by performing the process shown in FIG. 7B. The imaging apparatus 10 recognizes in step F212 reception of the camera notification data.

That is, the example shown in FIGS. 7B and 8B is an exemplary communication operation in which the imaging apparatus 10 constantly transmits query data on a periodical basis, and the nearby imaging instruction issuing apparatus 1 responds to this and transmits camera notification data.

The transmission timing in step F210 of FIG. 8B should not necessarily be periodical. For example, the imaging apparatus 10 may include a sensor for detecting a nearby person. Alternatively, the imaging apparatus 10 may include a processing block for recognizing the presence of a person by analyzing an image temporarily captured by the imaging unit 12. When the presence of a person is detected, it is determined that the transmission timing has been reached.

Figure 9:
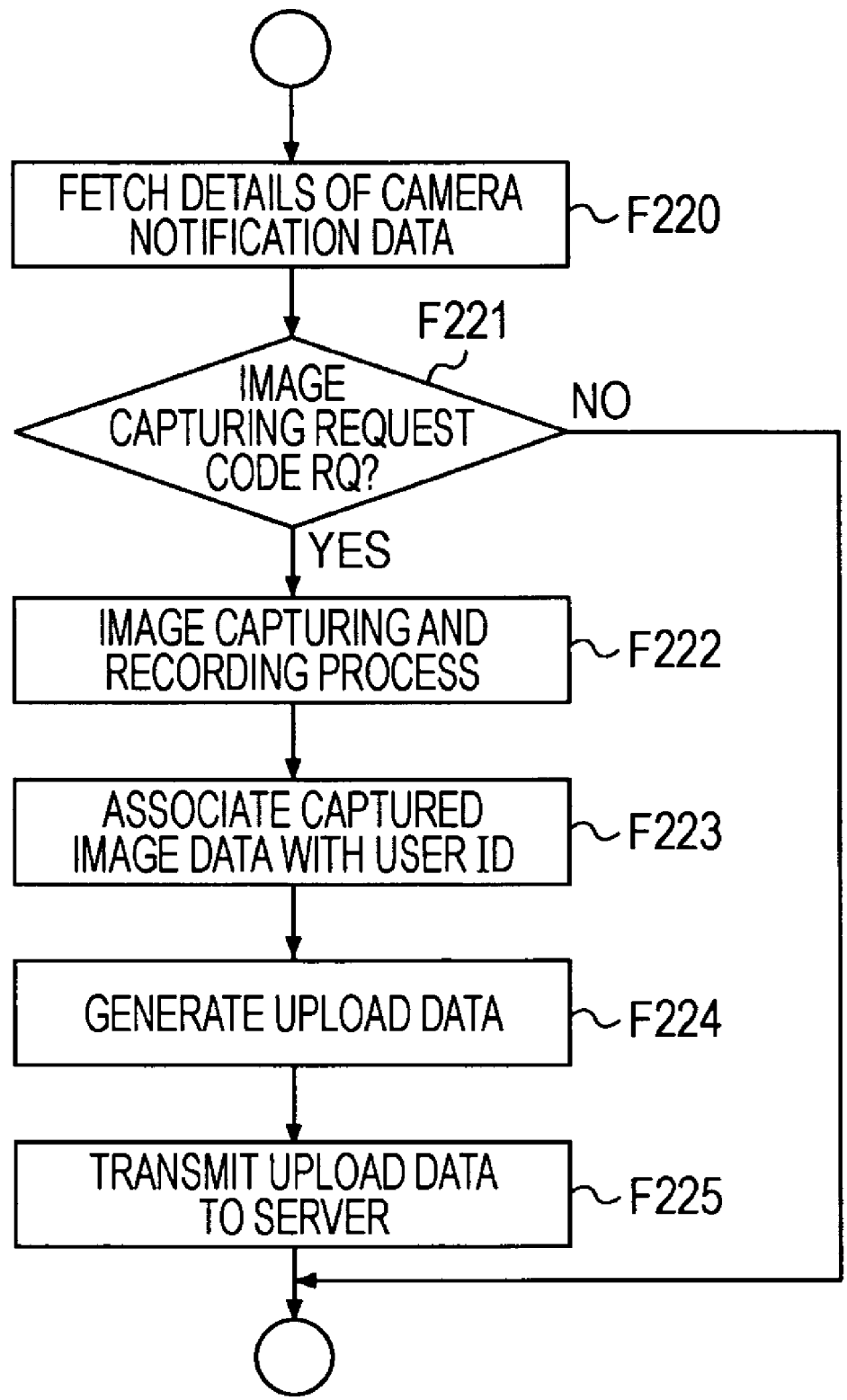
FIG. 9 is a flowchart of a process performed by the imaging apparatus according to the embodiment after receiving camera notification data.

Referring now to FIG. 9, a process performed by the system controller 11 of the imaging apparatus 10 when the system controller 11 recognizes reception of camera notification data is described.

With the communication operation based on the processes shown in FIGS. 7A, 7B, 8A, and 8B, when the instruction-issuing-apparatus communication unit 15 of the imaging apparatus 10 receives camera notification data from the imaging instruction issuing apparatus 1, in step F220 of FIG. 9, the system controller 11 fetches the demodulated details as the received camera notification data.

In step F221, the system controller 11 checks whether the camera notification data includes an image capturing request code RQ.

When the camera notification data includes no image capturing request code RQ but includes an image capturing prohibition code NP, the process is terminated.

When the camera notification data includes an image capturing request code RQ, the flow proceeds to step F222, and a process of capturing an image and recording captured image data is performed. That is, the system controller 11 instructs the imaging controller 13 to fetch captured image data obtained by the imaging unit 12 (for example, to fetch an image of one frame serving as a still image) and to transfer the captured image data to the storage unit 16, and the system controller 11 instructs the storage unit 16 to record the captured image data.

Further, in step F223, the system controller 11 performs a process of associating the recorded captured image data with a user ID. The user ID is a user ID included in the received camera notification data. For example, the user ID is transferred to the storage unit 16, and the user ID is recorded in association with the recorded captured image data.

In step F224, the system controller 11 generates upload data to be transmitted to the server apparatus 70. For example, the system controller 11 fetches the captured image data and the user ID recorded in the storage unit 16, which serve as upload data. Further, when the received camera notification data includes a password, the system controller 11 causes the encryption unit 18 to encrypt the captured image data. For example, an encryption key is generated by performing a predetermined arithmetic operation using the password, and the system controller 11 causes the encryption unit 18 to encrypt the captured image data using the encryption key. Accordingly, the system controller 11 generates upload data including the encrypted captured image data, the user ID, and the password.

In step F225, the system controller 11 supplies the upload data to the network communication unit 17 and causes the network communication unit 17 to encode the upload data for performing network communication and to upload and transmit the encoded upload data to the server apparatus 70.

Under control of the system controller 11 in the foregoing manner, upon receipt of camera notification data from the imaging instruction issuing apparatus 1, the imaging apparatus 10 performs an operation of capturing an image, recording captured image data in association with a user ID, generating upload data from the captured image data and the user ID, and uploading the upload data to the server apparatus 70.

In the foregoing example, the captured image data is encrypted in step F224 in which upload data is generated. Alternatively, the captured image data may be encrypted in step F222, and then the encrypted captured image data may be recorded in the storage unit 16.

Alternatively, the captured image data may not be encrypted by the imaging apparatus 10, and the unencrypted captured image data may be uploaded and transmitted.

In FIG. 9, the processing relating to uploading is performed in steps F224 and F225 immediately after step F223. Alternatively, the processing in steps F224 and F225 may be performed at an arbitrary later time. When camera notification data is received, it is only necessary to perform steps F220 to F223.

By performing the processes shown in FIGS. 7A, 7B, 8A, 8B, and 9 using the imaging instruction issuing apparatus 1 and the imaging apparatus 10, captured image data of the user U is uploaded to the server apparatus 70. Accordingly, for example, communication shown in FIG. 10 is performed.

Figure 10:
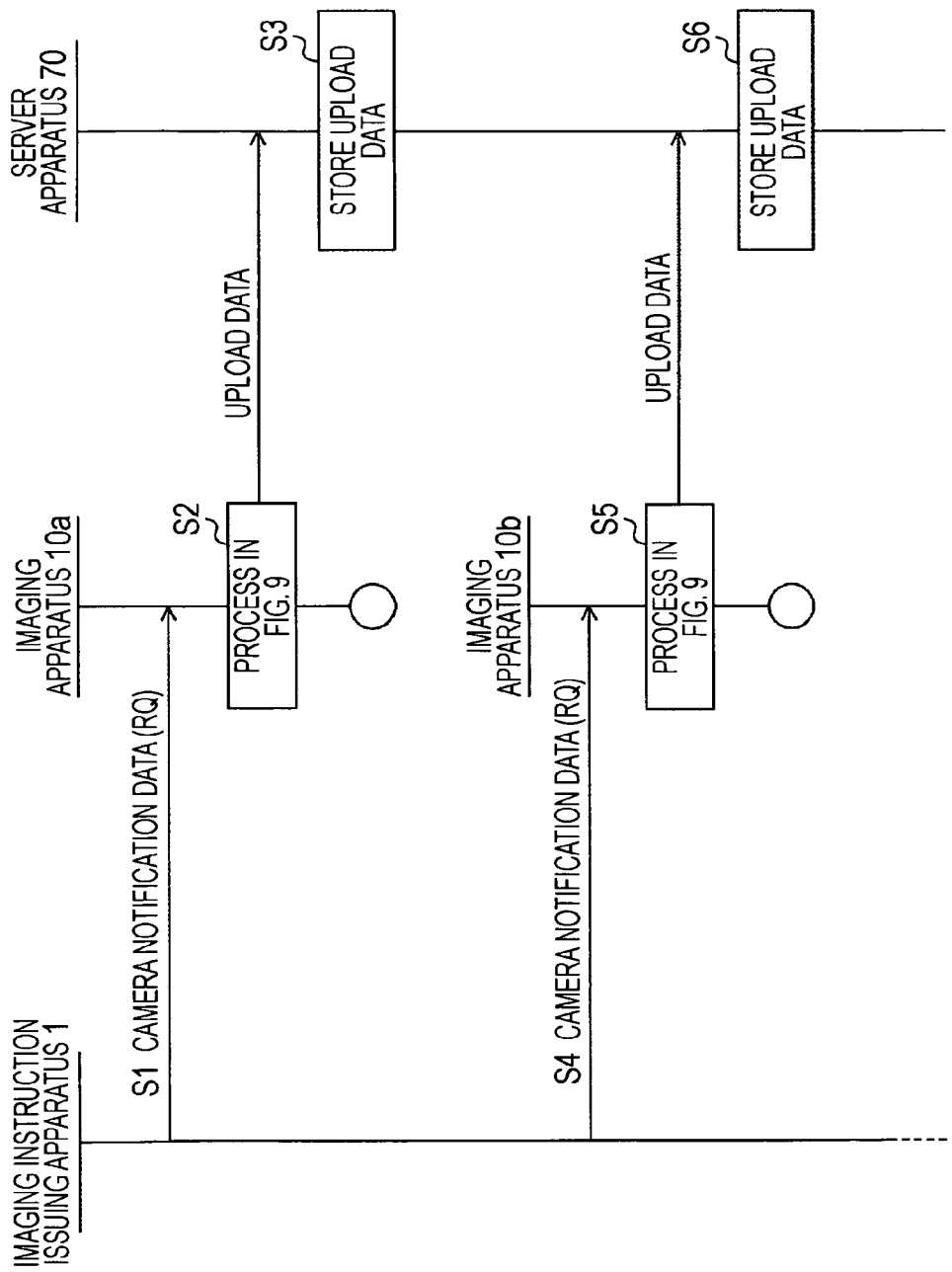
FIG. 10 is a chart illustrating a communication operation of the imaging system according to the embodiment.

FIG. 10 illustrates an operation performed by the imaging instruction issuing apparatus 1, the imaging apparatus 10, and the server apparatus 70 in accordance with, for example, the example shown in FIG. 2.

When the user U comes close to the imaging apparatus 10a, the imaging apparatus 10a receives camera notification data including an image capturing request code RQ from the imaging instruction issuing apparatus 1 (S1). The imaging apparatus 10a performs the process shown in FIG. 9 (S2). That is, the imaging apparatus 10a captures an image of a subject including the user U, generates upload data including captured image data (encrypted captured image data), a user ID, and a password, and transmits the upload data to the server apparatus 70.

In the server apparatus 70, the communication unit 73 receives the upload data, and the server controller 72 stores the upload data in the image database 77 (S3).

Next, when the user U comes close to the imaging apparatus 10b, the imaging apparatus 10b receives the camera notification data including the image capturing request code RQ from the imaging instruction issuing apparatus 1 (S4). The imaging apparatus 10b also performs the process shown in FIG. 9 (S5). That is, the imaging apparatus 10b captures an image of a subject including the user U, generates upload data including captured image data (encrypted captured image data), the user ID, and the password, and transmits the upload data to the server apparatus 70.

In the server apparatus 70, the communication unit 73 receives the upload data, and the server controller 72 stores the upload data in the image database 77 (S6).

By performing the foregoing operation, images of the user U serving as the subject are captured by the imaging apparatuses 10 in many places in accordance with the user's movement and actions, and the captured image data is uploaded to the server apparatus 70. Accordingly, the image database 77 of the server apparatus 70 accumulates, as shown in FIG. 11, each user's user ID and captured image data (encrypted captured image data). For example, when the user ID of the user U shown in FIG. 2, which is stored in the imaging instruction issuing apparatus 1, is "UID1" and images of the user U are captured by the imaging apparatuses 10a and 10b, items of captured image data K(PIC#1) and K(PIC#2), which are captured by the imaging apparatuses 10a and 10b and then encrypted, are stored in association with the user ID "UID1".

Similar processes are preformed for other users wearing the imaging instruction issuing apparatuses 1. For example, items of captured image data K(PIC#3), K(PIC#4), . . . corresponding to other user IDs including, for example, UID2 and UID3 are stored.

In this example, encrypted captured image data is stored in the image database 77. Alternatively, unencrypted captured image data may be stored in the image database 77.

When upload data includes a password, the user-information storage unit 78 of the server apparatus 70 manages a user ID and the password in an associated manner.

Using the user terminal 90, the user of the imaging instruction issuing apparatus 1 can obtain captured image data of the user from among items of captured image data stored in the server apparatus 70 in this manner.

Figure 12:
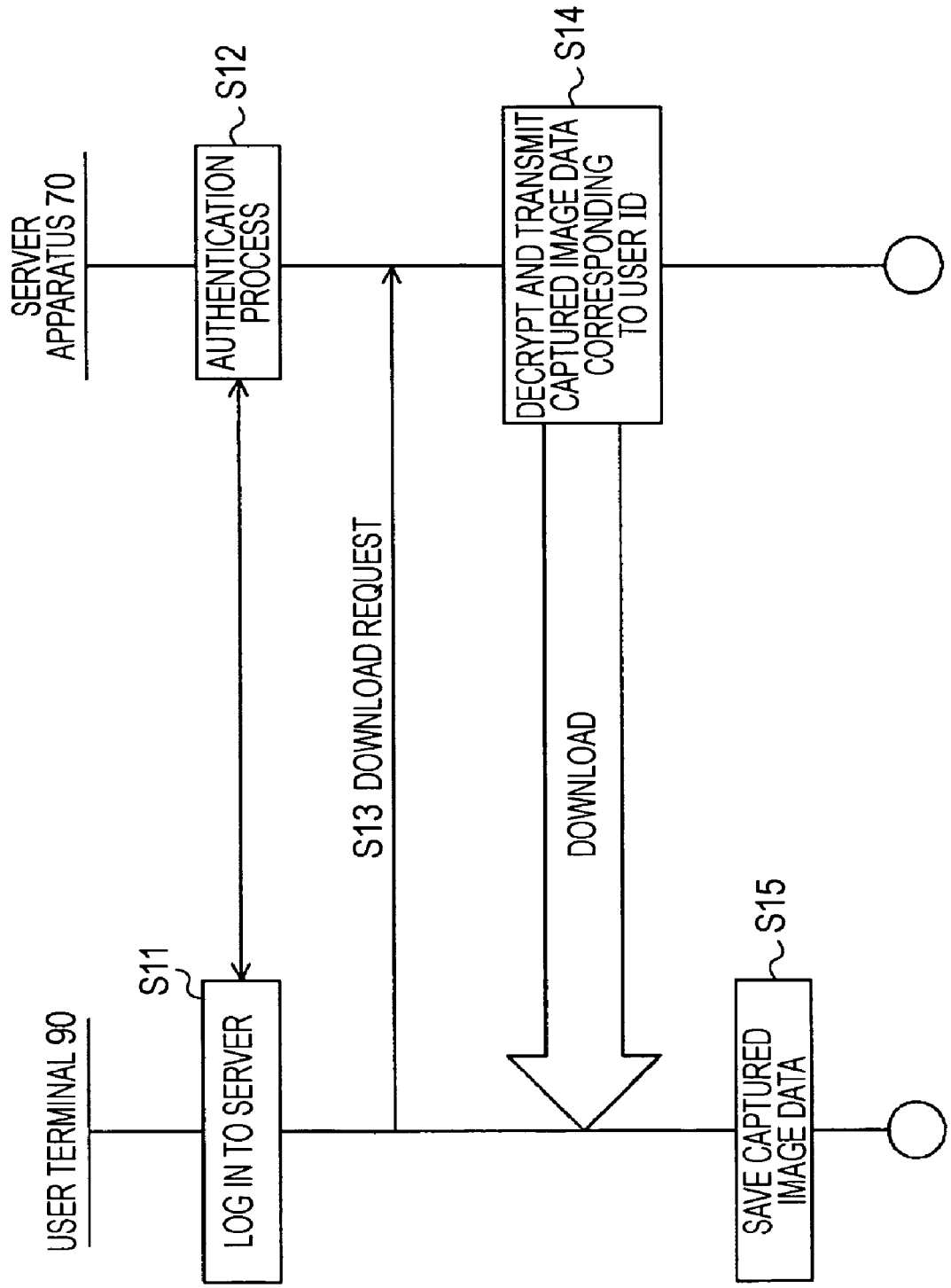
FIG. 12 is a chart illustrating a download operation according to the embodiment.

FIG. 12 illustrates a communication process performed by the user terminal 90 and the server apparatus 70 in order that the user terminal 90 can obtain captured image data.

Using the user terminal 90, the user accesses the server apparatus 70. For example, the user accesses a website of the server apparatus 70 and performs a log-in process (S11). In this case, for example, the user is asked to enter a user ID and password in order to log in to the website.

The user enters a user ID and password using the user terminal 90 and performs a log-in operation, and the server apparatus 70 performs an authentication process (S12). For example, the server controller 72 causes the information management unit 74 to check registered information in the user-information storage unit 78 and to determine whether the user ID and the password are registered and managed in an associated manner. When the user ID and the password are registered and managed in an associated manner, the authentication is considered successful.

By checking the user ID and the password of the user in the foregoing authentication process, the server apparatus 70 can extract, from among many items of captured image data stored in the image database 77, items of captured image data relating to the user who has logged in. That is, since the image database 77 stores a user ID and captured image data in an associated manner, as shown in FIG. 11, it is only necessary for the server apparatus 70 to extract captured image data corresponding to the user ID.

When the authentication is successful and the log-in operation is completed, the user terminal 90 transmits a download request (S13).

Upon receipt of the download request from the user terminal 90, the server controller 72 causes the information management unit 74 to extract, on the basis of the user ID, captured image data to be downloaded from the image database 77. In this case, for example, the information management unit 74 uses the password corresponding to the user ID and generates an encryption key for decryption using an arithmetic algorithm common or corresponding to encryption performed by the imaging apparatus 10. Using the encryption key, the information management unit 74 decrypts the captured image data extracted from the image database 77 and transfers the decrypted captured image data to the server controller 72.

The server controller 72 causes the communication unit 73 to transmit one or more items of captured image data transferred from the information management unit 74 to be downloaded to the user terminal 90 (S14).

The user terminal 90 records the downloaded captured image data in an internal recording device (S15). Accordingly, the user can obtain one or more items of captured image data which have been captured by the imaging apparatuses 10 in many places and which are expected to be images of the user.

After the authentication is considered successful and the log-in operation is completed, the server apparatus 70 may display a list of items of captured image data relating to the user on the website to which the user terminal 90 has logged in and may allow the user to select captured image data to download. In this case, using the user terminal 90, the user can select captured image data to download and makes a download request.

With the operation described in FIGS. 6 to 12, the user wearing the imaging instruction issuing apparatus 1 can cause the imaging apparatuses 10 provided in many places and the imaging apparatuses 10 carried by others to capture images of the user. The user can obtain these items of captured image data by accessing the server apparatus 70 from the user terminal 90. Accordingly, the user can easily obtain captured image data of the user in accordance with the user's action log.

The foregoing imaging system is configured to capture, by using the imaging apparatus 10, images of the user wearing the imaging instruction issuing apparatus 1. In this case, no image of the user wearing the imaging instruction issuing apparatus 1 can be captured unless the user is at a position where the user can serve as a subject of an image captured by the imaging apparatus 10.

Many methods for causing the imaging apparatus 10 to capture images of the user wearing the imaging instruction issuing apparatus 1 are conceivable. Exemplary methods are described below.

In one example, a directional signal is used as a transmission signal of the camera communication unit 3 of the imaging instruction issuing apparatus 1. For example, communication is performed between the camera communication unit 3 and the instruction-issuing-apparatus communication unit 15 of the imaging apparatus 10 using visible light or invisible light with a narrow directional angle.

The camera communication unit 3 of the imaging instruction issuing apparatus 1 transmits camera notification data using an optical signal with a narrow directional angle by performing the process shown in FIG. 7A. In this case, when the user wears the imaging instruction issuing apparatus 1 at a proper position (in a light emitting direction), as the user comes into the subject direction of the imaging apparatus 10, the imaging apparatus 10 receives the camera notification data and performs the process shown in FIG. 9 to capture and record an image of a subject including the user.

In the case where, as shown in FIGS. 7B and 8B, the instruction-issuing-apparatus communication unit 15 of the imaging apparatus 10 transmits query data and the imaging instruction issuing apparatus 1 transmits camera notification data in response to the query data, the instruction-issuing-apparatus communication unit 15 may transmit query data using visible light or invisible light with a narrow directional angle.

When the imaging apparatus 10 transmits, from the instruction-issuing-apparatus communication unit 15, query data using visible light or invisible light with a narrow directional angle toward the subject direction, the imaging apparatus 10 can receive camera notification data from the imaging instruction issuing apparatus 1 of the user who is in the subject direction. Accordingly, the imaging apparatus 10 performs the process shown in FIG. 9 in accordance with the camera notification data received in the state where the user is in the subject direction of the imaging apparatus 10, and the imaging apparatus 10 can capture and record an image of a subject including the user.

Another possible method is that, as has been described above, when the imaging instruction issuing apparatus 1 includes the position detector 6 and transmits camera notification data additionally including position information, the imaging apparatus 10 may perform the process shown in FIG. 9 in accordance with the position information.

That is, upon receipt of the camera notification data, the imaging apparatus 10 checks the position information and determines whether the position information indicates a position included in the subject direction. When it is determined that the position information specifies a position included in the subject direction, the imaging apparatus 10 performs the process shown in FIG. 9. For example, when the imaging instruction issuing apparatus 1 adds position information specifying the position with an accuracy of one to about a few meters to be included in camera notification data, the imaging apparatus 10 can substantially reliably determine whether the user is in the subject direction.

When the imaging apparatus 10 is provided at a fixed position and the subject direction is fixed, the subject direction of the imaging apparatus 10 can be determined in advance. Therefore, the system controller 11 may store a position information range corresponding to the subject direction. When the imaging apparatus 10 can change an image capturing direction by panning or tilting the imaging apparatus 10, the position information range corresponding to the subject direction may be changed in accordance with the panning operation or tilting operation. When the imaging apparatus 10 is not provided at a fixed position, if the imaging apparatus 10 has a position detector or an angle sensor so that the imaging apparatus 10 can constantly detect the subject direction of the image capturing operation, the imaging apparatus 10 can determine whether the user is in the subject direction by comparing position information included in camera notification data with the current subject direction.

Alternatively, the imaging apparatus 10 is set to an image capturing state with a relatively wide angle, and the range where the camera communication unit 3 of the imaging instruction issuing apparatus 1 and the instruction-issuing-apparatus communication unit 15 of the imaging apparatus 10 can communicate with each other is set to a relatively short distance (for example, by limiting the intensity of radio waves), which are suitable for, for example, the imaging apparatus 10 provided at a fixed position. In such a case, when the imaging apparatus 10 receives camera notification data, it can be estimated that the user is highly likely to be within the range of the subject direction of the imaging apparatus 10. That is, in this case, when the imaging apparatus 10 performs the process shown in FIG. 9 in response to reception of camera notification data, an image of the appearance of the user is highly likely to be captured.

The imaging apparatus 10 receives camera notification data when the user wearing the imaging instruction issuing apparatus 1 is in the vicinity of the imaging apparatus 10. Taking this into consideration, without determining whether the user is in the subject direction, in accordance with the camera notification data, items of captured image data serving as still images may be saved in association with a user ID, or captured image data serving as moving image data may be saved in association with a user ID.

The captured image data serving as many still images or a moving image is uploaded to the server apparatus 70. When the user accesses the server apparatus 70 from the user terminal 90, the user selects images of the user from among images presented on the basis of the user ID and makes a download request. Accordingly, the user can obtain captured image data of the user. Alternatively, the captured image data uploaded in association with the user ID may be downloaded, regardless of whether the captured image data corresponds to images of the user, and the user may select images in the user terminal 90 at a later time.

When the imaging apparatus 10 determines a user wearing the imaging instruction issuing apparatus 1, the imaging apparatus 10 may track the user and capture multiple still images or a moving image of the user.

For example, the imaging apparatus 10 analyzes one or more captured images and performs a face detection process. For example, when a target user is specified using the foregoing position information in captured image data obtained by the imaging unit 12, the imaging apparatus 10 performs face recognition of the target user to detect the position of the target user in each frame image. Panning is performed according to the position of the target user in the image so that the target user can be at the center of the captured image. With the foregoing process, the imaging apparatus 10 can track a target user and capture multiple still images or a moving image of the target user.

4. Another Exemplary Process (Marking Process) Performed by Imaging Apparatus

The exemplary process performed by the imaging apparatus 10 upon reception of camera notification data has been described with reference to FIG. 9. Alternatively, the system controller 11 of the imaging apparatus 10 may perform, for example, processes shown in FIGS. 13A and 13B, instead of the process shown in FIG. 9.

Figure 13A:
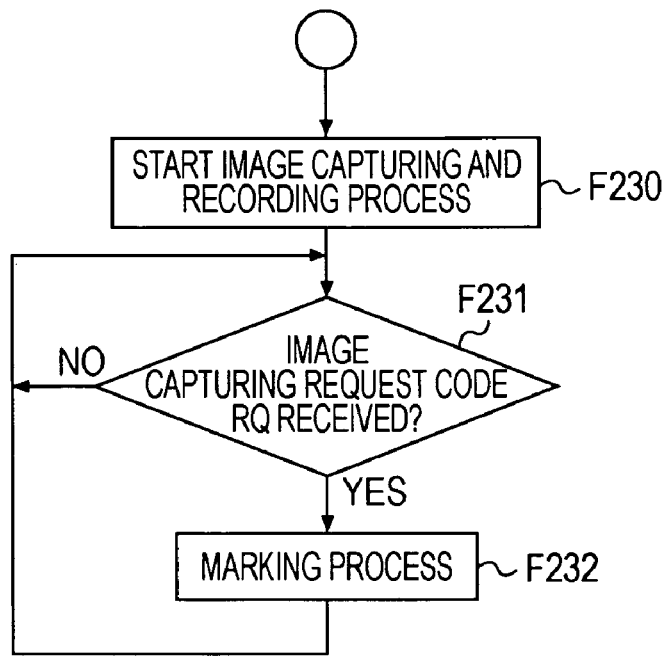
FIGS. 13A and 13B are flowcharts of other exemplary processes performed by the imaging apparatus according to the embodiment.

In step F230 of FIG. 13A, the system controller 11 causes the imaging unit 12, the imaging controller 13, and the storage unit 16 to start a process of capturing an image and recording captured image data. For example, it is assumed that the imaging apparatus 10 constantly captures images. When power of the imaging apparatus 10 is switched on, the processing in step F230 is performed, and capturing and recording of images are started.

The expression "constantly captures images" means captured image data serving as a moving image is continuously recorded or captured image data serving as successive intermittent still images is periodically recorded, for example, every two seconds.

After the system controller 11 starts constantly capturing images, the system controller 11 waits for camera notification data to be received in the process shown in FIG. 7A or 8B. When camera notification data is received and the camera notification data includes an image capturing request code RQ, the flow proceeds from step F231 to F232 in FIG. 13A, and a marking process is performed.

The marking process is a process of associating a user ID included in the camera notification data with a current image point of the constantly captured image data serving as a moving image or multiple still images. For example, the user ID may be associated with a time code given to the captured image data. When the camera notification data includes a password, the password is similarly associated with the image point and stored, as in the user ID.

With the process shown in FIG. 13A, every time camera notification data is received, a user ID (and password) is associated with an image point at that point of captured image data stored in the storage unit 16.

Figure 13B:
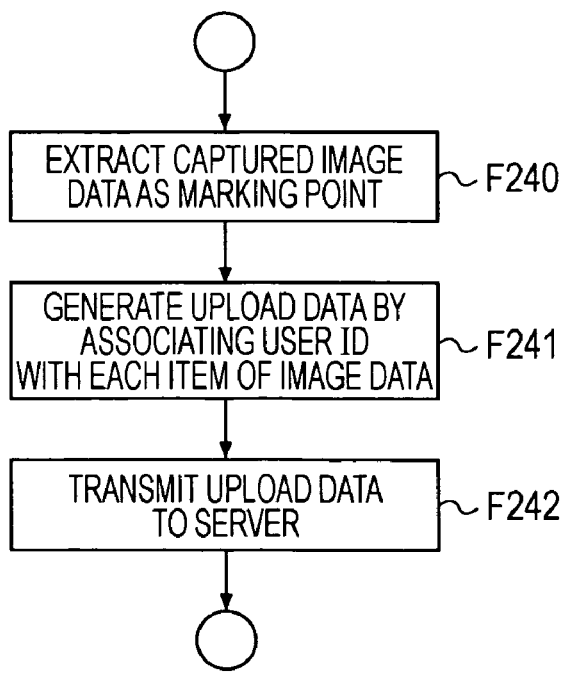

Thereafter, the system controller 11 performs an upload process shown in FIG. 13B at an arbitrary time.

In step F240, the system controller 11 extracts captured image data serving as a marking point. For example, the system controller 11 extracts, from captured image data stored as a moving image, captured image data serving as a still image of one frame at a marking point. Alternatively, the system controller 11 extracts, from captured image data stored as periodically captured still images, captured image data serving as a still image at a marking point.

In step F241, the system controller 11 associates the user ID (and password) recorded at the time of marking with each item of the extracted captured image data and generates upload data. In this case, the system controller 11 may encrypt the captured image data using an encryption key generated using the password.

In step F242, the system controller 11 transfers the upload data to the network communication unit 17 and causes the network communication unit 17 to transmit the upload data to the server apparatus 70.

With the processes shown in FIGS. 13A and 13B, as a result, the server apparatus 70 stores the captured image data and the user ID serving as the upload data, as shown in FIG. 11. That is, a system operation similar to the case where the process shown in FIG. 9 is performed can be performed.

5. Another Exemplary Process (Prohibition Code Corresponding Process) Performed by Imaging Apparatus In the exemplary process shown in FIG. 9 or 13A, whether camera notification data includes an image capturing request code RQ is determined. In particular, when camera notification data includes no image capturing request code RQ but includes an image capturing prohibition code NP, an example of a more appropriate process is conceivable. This exemplary process performed by the system controller 11 is shown in FIG. 14.

Figure 14:
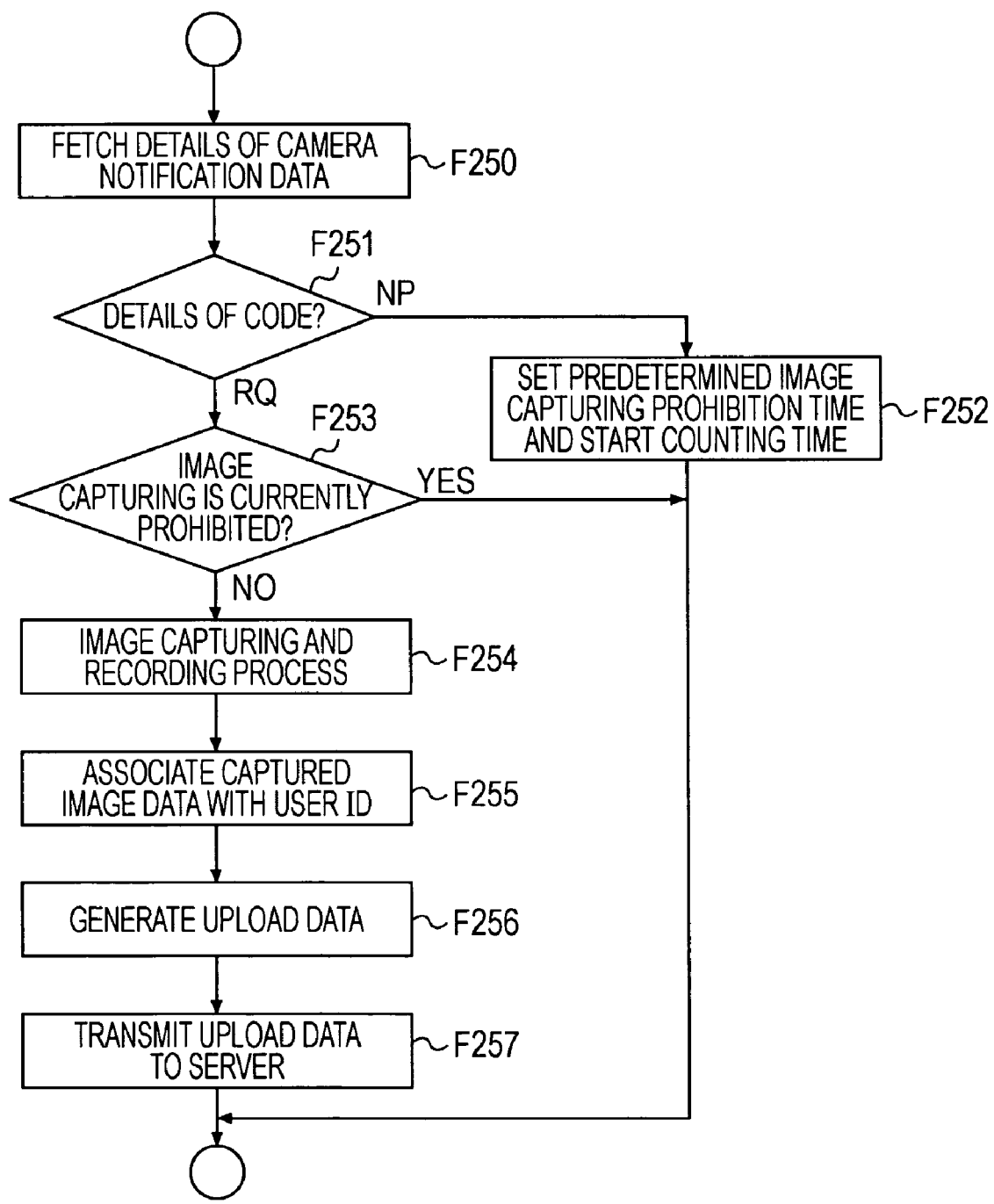
FIG. 14 is a flowchart of yet another exemplary process performed by the imaging apparatus according to the embodiment.

Since steps F250 and F254 to F257 of FIG. 14 are similar to steps F220 and F222 to F225 of FIG. 9, detailed descriptions thereof are omitted.

In the process shown in FIG. 14, the system controller 11 fetches the details of camera notification data in step F250. In step F251, the process is branched according to whether the details of a code indicate an image capturing request code RQ or an image capturing prohibition code NP.

When the image capturing prohibition code NP is included in the camera notification data, the flow proceeds to step F252, and the system controller 11 sets a predetermined time in which capturing of images is prohibited. The system controller 11 starts counting the predetermined time in which capturing of images is prohibited.

The image capturing prohibition setting prohibits recording of captured image data into the storage unit 16 within the set period of time. Alternatively, within the set period of time in which capturing of images is prohibited, captured image data may be recorded in the storage unit 16, but may not be allowed to be included in upload data to be transmitted to the server apparatus 70.

The predetermined period of time in which capturing of images is prohibited may be set to various times, such as one minute, a few minutes, and a longer time. For example, when the imaging instruction issuing apparatus 1 periodically transmits camera notification data as shown in FIG. 7A, the predetermined period of time in which capturing of images is prohibited may be set to a time corresponding to the transmission interval.

The predetermined period of time in which capturing of images is prohibited, which is set by the imaging apparatus 10 in step F252, is the period in which the user who has asked to prohibit capturing of images is estimated to be in the vicinity of the imaging apparatus 10, that is, the period in which the user is likely to serve as the subject of captured images.

Since the user's movement and actions are occasional, the user who has asked to transmit the image capturing prohibition code NP may be perpetually present in the vicinity of the imaging apparatus 10. In such a case, the imaging apparatus 10 receives the camera notification data including the image capturing prohibition code NP. Thus, counting of the predetermined period of time in which capturing of images is prohibited is restarted in step F252.

In some cases, when capturing of images is prohibited by performing the processing in step F252, camera notification data including an image capturing request code RQ may be received. For example, a plurality of users are in the vicinity of the imaging apparatus 10. With the operation shown in FIG. 6, at least one of the users sets the user's imaging instruction issuing apparatus 1 to prohibit capturing of images, and at least one of the other users sets the other user's imaging instruction issuing apparatus 1 to make an image capturing request. In such a case, upon detection of the image capturing request code RQ, the system controller 11 proceeds from step F251 to F253. However, the process does not proceed to step F254 within the period of time in which capturing of images is prohibited, and the process is terminated.

That is, no image is captured in the case where at least one of the nearby users has asked to prohibit capturing of images.

With the foregoing process, the intention of the user who wants to prohibit capturing of images is respected, and disadvantages caused by capturing images in a thoughtless manner can be avoided.

By analyzing images of the subject and transmitting camera notification data including position information together with an image capturing prohibition code NP, the imaging apparatus 10 can specify, in captured image data, the appearance of the user who wants to prohibit capturing of images. In such a case, the image is edited by making only an image portion of the user into a mosaic or coloring the image portion black, thereby making the user's appearance unnoticeable. Thereafter, processing in accordance with the image capturing request code RQ sent from the other user may be performed.

6. Actual Examples of Wearable Device

In the foregoing examples, the user wears the imaging instruction issuing apparatus 1 and causes the imaging apparatus 10, which is a different apparatus, to capture images of the user. Alternatively, the imaging instruction issuing apparatus 1 and the imaging apparatus 10 may be integrated as a wearable device.

Figure 15A:
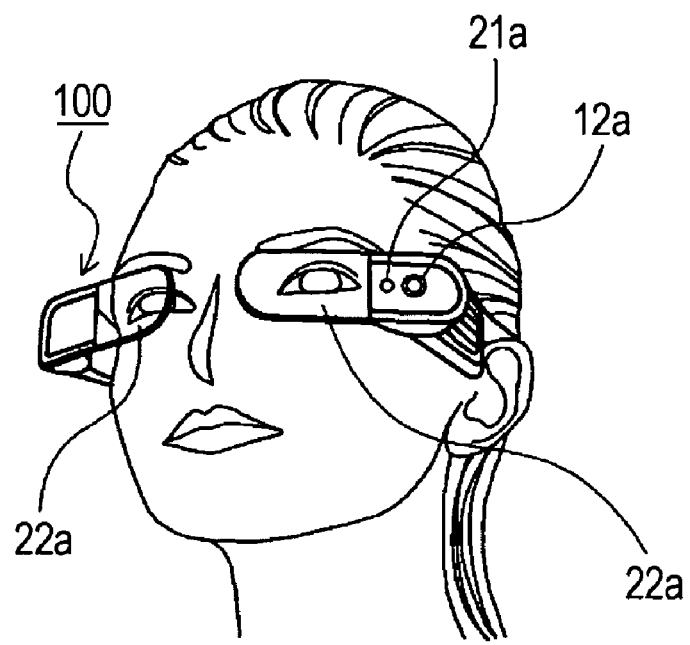
FIGS. 15A and 15B are illustrations of an imaging and imaging-instruction-issuing apparatus according to the embodiment.
Figure 15B:
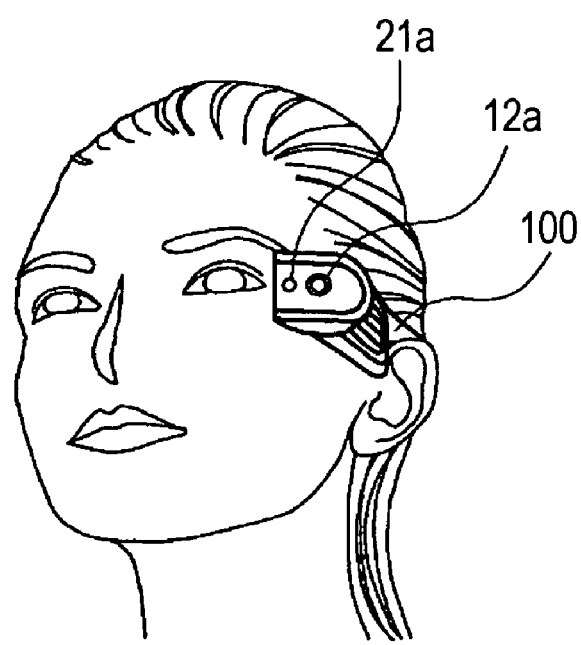

FIGS. 15A and 15B illustrate exemplary appearances of an imaging and imaging-instruction-issuing apparatus 100. The imaging and imaging-instruction-issuing apparatus 100 functions as the imaging instruction issuing apparatus 1 for the user who is wearing the imaging and imaging-instruction-issuing apparatus 100 and as the imaging apparatus 10 for others.

FIG. 15A illustrates the imaging and imaging-instruction-issuing apparatus 100 having the shape of a glasses-type display camera. This imaging and imaging-instruction-issuing apparatus 100 has, for example, a mounting unit with a frame structure that rotates halfway from the temporal regions to the occipital region. The imaging and imaging-instruction-issuing apparatus 100 is worn by the user by fitting it to the pinnae, as shown in FIG. 15A.

When the imaging and imaging-instruction-issuing apparatus 100 is worn by the user, an imaging lens 12a is positioned facing front so that the imaging lens 12a can capture images with the user's viewing direction coinciding with the subject direction.

When the imaging and imaging-instruction-issuing apparatus 100 is worn by the user as shown in FIG. 15A, a pair of display panel units 22a for the left and right eyes is arranged immediately in front of the eyes of the user, that is, at positions where the lenses of a general type of glasses are located. For example, liquid crystal panels are used in the display panel units 22a. By controlling the transparency of the display panel units 22a, the display panel units 22a can be in a through state shown in FIG. 15A, that is, a transparent or translucent state. Since the display panel units 22a are in a through state, when the user constantly wears the imaging and imaging-instruction-issuing apparatus 100 as wearing glasses, the user can conduct everyday life without any trouble.

Instead of providing the pair of display panel units 22a for the two eyes, only one display panel unit 22a may be provided for one eye.

Further, the imaging and imaging-instruction-issuing apparatus 100 includes a light emitting/receiving unit 21a that performs communication using visible light or invisible light such as infrared rays.

FIG. 15B illustrates another example of the imaging and imaging-instruction-issuing apparatus 100 similarly worn on the head of the user. However, this imaging and imaging-instruction-issuing apparatus 100 includes no display panel units 22a, such as those shown in FIG. 15A. For example, the imaging and imaging-instruction-issuing apparatus 100 shown in FIG. 15B is worn on the head of the user using, for example, a mounting unit that can be fitted to one pinna. In this state, the imaging lens 12a is positioned facing front so that the imaging lens 12a can capture images with the user's viewing direction coinciding with the subject direction. Further, the imaging and imaging-instruction-issuing apparatus 100 includes the light emitting/receiving unit 21a.

With reference to FIGS. 15A and 15B, the examples of the imaging and imaging-instruction-issuing apparatus 100 that can be worn on the head of the user using the glasses-type or head-mounting-type mounting unit have been described. Alternatively, various other structures are conceivable for enabling the user to wear the imaging and imaging-instruction-issuing apparatus 100. The mounting unit may be, for example, a headphone type, a neckband type, or an ear clip type. That is, the mounting unit may be any type as long as the imaging and imaging-instruction-issuing apparatus 100 can be worn by the user. Further, the imaging and imaging-instruction-issuing apparatus 100 may be worn by the user by attaching it to, for example, a general type of glasses, a visor, or headphones using a fixture such as a clip. Alternatively, the imaging and imaging-instruction-issuing apparatus 100 may not necessarily be worn on the head of the user.

In the foregoing examples, the image capturing direction is the user's viewing direction. Alternatively, for example, when the imaging and imaging-instruction-issuing apparatus 100 is worn by the user, the imaging lens 12a may be arranged facing back, right, left, up, or down so that the imaging lens 12a can capture images behind, beside, above, or below the user. Alternatively, multiple imaging systems having the same or different image capturing directions may be provided.

Further, the imaging and imaging-instruction-issuing apparatus 100 may include an image-capturing-direction changing mechanism that can manually or automatically change the subject direction of one or more imaging lenses 12a.

FIG. 16 illustrates an exemplary internal structure of the imaging and imaging-instruction-issuing apparatus 100.

In FIG. 16, elements corresponding to those shown in FIG. 4 are given the same reference numerals, and detailed descriptions thereof are omitted.

The imaging unit 12 performs, using an image pickup device implemented by a CCD sensor array or a CMOS sensor array, photoelectric conversion of an image of a subject, which is obtained by a lens system including the imaging lens 12a shown in FIG. 15A or 15B.

A subject/camera communication unit 21 is a communication unit that performs operation of both the camera communication unit 3 shown in FIG. 3 and the instruction-issuing-apparatus communication unit 15 shown in FIG. 4. Using the light emitting/receiving unit 21a shown in FIG. 15A or 15B, the subject/camera communication unit 21 performs light emission and reception. Accordingly, two imaging and imaging-instruction-issuing apparatuses 100 can perform optical communication with each other. Further, the imaging and imaging-instruction-issuing apparatus 100 can perform optical communication with other devices including the imaging instruction issuing apparatus 1 and the imaging apparatus 10.

That is, in order to cause the imaging and imaging-instruction-issuing apparatus 100 to function as the foregoing imaging instruction issuing apparatus 1, for example, the system controller 11 causes the subject/camera communication unit 21 to transmit camera notification data by performing the process shown in FIG. 7A or 7B. The camera notification data is received by another imaging and imaging-instruction-issuing apparatus 100 worn by a nearby person or by the imaging apparatus 10 located nearby.

In order to receive camera notification data from another imaging and imaging-instruction-issuing apparatus 100 (or the imaging instruction issuing apparatus 1), the system controller 11 performs the process shown in FIG. 8A or 8B and monitors whether the subject/camera communication unit 21 receives camera notification data.

In this example, the description assumes that the subject/camera communication unit 21 performs optical communication. Alternatively, the subject/camera communication unit 21 may perform radio communication.

When the imaging and imaging-instruction-issuing apparatus 100 has a display structure shown in FIG. 15A, the imaging and imaging-instruction-issuing apparatus 100 has a display unit 22 and a display controller 23, as shown in FIG. 16.

The display unit 22 includes the above-described display panel units 22a implemented by liquid crystal panels or the like and a display drive unit that drives displaying of the display panel units 22a. The display drive unit includes a pixel drive circuit for displaying an image represented by image data supplied from the imaging controller 13 on the display panel units 22a implemented by, for example, liquid crystal displays. The pixel drive circuit applies drive signals based on video signals to pixels arranged in a matrix in each of the display panel units 22a at predetermined horizontal and vertical drive timings and displays an image on each of the display panel units 22a.

Under control of the system controller 11, the display controller 23 drives the pixel drive circuit in the display unit 22 and causes the display panel units 22a to perform a predetermined display operation. For example, the display panel units 22a are caused to perform a display operation as imaging monitors in accordance with an imaging operation of the imaging unit 12 or to reproduce captured image data stored in the storage unit 16 and display an image represented by the captured image data.

On the basis of an instruction issued by the system controller 11, the display controller 23 can control the display drive unit to control the transparency of each of the pixels of the display panel units 22a to achieve a through state (transparent or translucent state).

While the user uses the foregoing imaging and imaging-instruction-issuing apparatus 100 as an imaging instruction issuing apparatus for requesting another imaging apparatus to capture images of the user, the user also enables the imaging and imaging-instruction-issuing apparatus 100 to function as an imaging apparatus to capture images in response to an image capturing request code RQ given from another user.

For example, the system controller 11 performs the process shown in FIG. 7A or 7B to cause the subject/camera communication unit 21 to transmit and output camera notification data, and the camera notification data is received by the imaging apparatus 10 located nearby or by the imaging and imaging-instruction-issuing apparatus 100 worn by another nearby user.

Upon receipt of camera notification data supplied from the imaging and imaging-instruction-issuing apparatus 100 or the imaging instruction issuing apparatus 1 worn by another user, the system controller 11 performs the process shown in FIG. 9 (or FIG. 13A, 13B, or 14) to capture images of the other user, record captured image data, and upload the captured image data to the server apparatus 70.

Therefore, when the user wearing the imaging and imaging-instruction-issuing apparatus 100 faces another user similarly wearing another imaging and imaging-instruction-issuing apparatus 100 or comes close to the imaging apparatus 10, an image of the user is captured by the other imaging and imaging-instruction-issuing apparatus 100 or by the imaging apparatus 10, and the captured image is uploaded to the server apparatus 70. Accordingly, the user can access the server apparatus 70 from the user terminal 90 and obtain captured image data of the user.

In particular, when it becomes general for many people to wear this imaging and imaging-instruction-issuing apparatus 100, it means that there are many cameras that capture images of each user. Accordingly, there are more chances for each user to have each user's images captured in everyday life.

The above description concerns the examples in which the glasses-type display camera functions both as the imaging instruction issuing apparatus 1 and the imaging apparatus 10. However, the imaging instruction issuing apparatus 1 or the imaging apparatus 10 may be implemented as a glasses-type display camera.

7. Advantages and Modifications of Embodiments

According to the foregoing embodiments, images of a user wearing or carrying the imaging instruction issuing apparatus 1 (or the imaging and imaging-instruction-issuing apparatus 100) are automatically captured by the imaging apparatus 10 (or by another imaging and imaging-instruction-issuing apparatus 100). Therefore, when a user who wants to have the user's images captured as, for example, a life log or an action log wears or carries the imaging instruction issuing apparatus 1, the user can cause the imaging apparatus 10 to capture images of the user and thereafter obtain captured image data of the user from the server apparatus 70.

Therefore, an imaging system in which images of a user can be captured by the imaging apparatus 10 not carried by the user in accordance with the user's movement and actions is realized, and the user can easily obtain captured image data of the user.

In contrast, for a user who does not want to have the user's images captured, it is only necessary to set the imaging instruction issuing apparatus 1 to output an image capturing prohibition code NP. Accordingly, capturing of images of the user in a thoughtless manner disregarding the user's intention can be avoided.

Image data captured in response to an image capturing request code RQ is encrypted by the server apparatus 70 with an encryption key based on a password and stored in the server apparatus 70. Accordingly, the captured image data can be kept secret from everyone other than the user. The user's request that images of the user should not be made public can be fulfilled.

The present invention is not limited to the foregoing embodiments, and various modifications can be made to the structures of and processes performed by the imaging instruction issuing apparatus 1, the imaging apparatus 10, and the server apparatus 70.

The imaging instruction issuing apparatus 1 worn or carried by the user may not be a dedicated apparatus. Another apparatus may include the function of the imaging instruction issuing apparatus 1. For example, an apparatus such as a mobile phone, a PDA, a portable music player, or a portable video player may have the structure shown in FIG. 3 or the processing functions shown in FIGS. 6, 7A, and 7B, thereby realizing an imaging instruction issuing apparatus according to an embodiment of the present invention.

Captured image data stored in the imaging apparatus 10 in response to an image capturing request code RQ may be either a still image or a moving image. For example, the imaging instruction issuing apparatus 1 may add, besides the image capturing request code RQ, data indicating a still or moving image to be included in camera notification data. In accordance with the data indicating a still or moving image, the imaging apparatus 10 may decide which of the still and moving images is to be stored in association with a user ID.

In the foregoing description, the imaging apparatus 10 stores captured image data in association with a user ID and password. Further, the imaging apparatus 10 may store captured image data in association with time and date information (second, minute, hour, date, month, and year) and position information and upload the captured image data with these items of information to the server apparatus 70, and the server apparatus 70 may store the captured image data and these items of information.

Captured image data may either be encrypted or not encrypted. According to the user's setting, the imaging instruction issuing apparatus 1 may add data indicating an instruction to encrypt or not to encrypt captured image data or data indicating an encryption level to be included in camera notification data, and the imaging apparatus 10 and the server apparatus 70 may perform processing in accordance with the encryption instruction data.

Alternatively, captured image data may be encrypted not by the imaging apparatus 10, but by the server apparatus 70. For example, when captured image data is uploaded to the server apparatus 70, the server apparatus 70 may encrypt the captured image data. Alternatively, the server apparatus 70 may encrypt the captured image data when presenting the captured image data on a website. Alternatively, the server apparatus 70 may encrypt the captured image data when the captured image data is downloaded.

Further, encrypted captured image data may be decrypted at various times. For example, when a list of items of encrypted captured image data is displayed on a website, if users who browse the website can be restricted, the encrypted captured image data may be decrypted and the details of images may be opened to these users. Alternatively, encrypted captured image data may be decrypted immediately before being downloaded and transmitted.

Further, encrypted captured image data may be made not decryptable by the imaging apparatus 10 and the server apparatus 70. After encrypted captured image data is downloaded to the user's user terminal 90, the user terminal 90 may decrypt the encrypted captured image data using a password or the like. In particular, the user feels safe if captured image data remains encrypted from the time it is stored in the storage unit 16 of the imaging apparatus 10 to the time it is finally downloaded to the user terminal 90. That is, since images of the user are not decryptable when they are stored in the imaging apparatus 10 and the server apparatus 70, which are not owned by the user, the possibility of abusing the images or infringing the user's right of publicity can be eliminated.

In the foregoing description, the imaging instruction issuing apparatus 1 is worn or carried by a person. Alternatively, for example, the imaging instruction issuing apparatus 1 may be mounted on a vehicle used by a user, such as a car, a bicycle, or a bike. Accordingly, for example, images can be captured while the user is traveling by car (image data of the user's car can be captured).

Alternatively, when the imaging instruction issuing apparatus 1 is worn by a user's pet such as a dog or a cat, the user can obtain images serving as the pet's action log at a later time.

It is preferable that the imaging system include, as shown in FIG. 1, many imaging apparatuses 10 (or imaging and imaging-instruction-issuing apparatuses 100). However, depending on the purpose, the imaging system functions effectively even when the imaging system includes only one imaging apparatus 10. For example, when one imaging apparatus 10 is provided in a specific place where a user frequently visits, images of the appearance of the user can be captured every time the user visits the place, and the user can obtain these images. Accordingly, the system operation is useful.

In the foregoing description, the imaging apparatus 10 uploads captured image data to the server apparatus 70, and the user uses the user terminal 90 to download the captured image data from the server apparatus 70. Alternatively, the imaging system may be configured without having the independent server apparatus 70.

For example, one system operation is conceivable in which the imaging apparatus 10 has the function of a server apparatus, and the user uses the user terminal 90 to access the imaging apparatus 10 and download, from among items of captured image data stored in the storage unit 16, captured image data of the user.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging system comprising:
an imaging instruction issuing apparatus; and
one or more imaging apparatuses,
wherein the imaging instruction issuing apparatus includes:
at least one storage device configured to store an image capturing request code and an image capturing prohibition code;
inputting means for receiving from a user, an indication of whether to transmit the image capturing request code or the image capturing prohibition code;
setting means for setting an image request signal in accordance with the indication received by the inputting means, wherein setting the image request signal comprises retrieving from the at least one storage device, the image capturing request code or the image capturing prohibition code in accordance with the indication;
generation means for generating notification data including the image request signal and identification information identifying the imaging instruction issuing apparatus, and
first communication means for transmitting and outputting the notification data to the one or more imaging apparatuses, and wherein each of the one or more imaging apparatuses includes:
- imaging means for obtaining captured image data of a subject,
- saving means for saving the captured image data obtained by the imaging means,
- second communication means for receiving the notification data from the imaging instruction issuing apparatus, and
- control means for causing the saving means to perform a saving process of saving the captured image data obtained by the imaging means and the identification information included in the notification data in an associated manner when the image request signal in the notification data received by the second communication means includes the image capturing request code.

2. The imaging system according to claim 1, further comprising a server apparatus,
wherein the one or more imaging apparatuses each include third communication means for performing data communication with the server apparatus, and the control means controls the third communication means to transmit the saved captured image data and identification information to the server apparatus, and
wherein the server apparatus includes
- fourth communication means for performing data communication with the one or more imaging apparatuses,
- storage means for storing data, and
- server control means for causing, when the fourth communication means receives the captured image data and the identification information from the one or more imaging apparatuses, the storage means to store the captured image data and the identification information.

3. The imaging system according to claim 1, wherein the imaging instruction issuing apparatus, further comprises position detecting means for detecting current position information,
wherein the generation means generates the notification data additionally including the position information detected by the position detecting means.

4. The imaging system according to claim 1, wherein the notification data additionally includes information used for an encryption process performed by at least one of the one or more imaging apparatus apparatuses.

5. The imaging system according to claim 1, wherein the first communication means transmits and outputs the notification data at a transmission timing at periodic or irregular intervals.

6. The imaging system according to claim 1, wherein the first communication means transmits and outputs the notification data to the one or more imaging apparatuses upon receipt of a query signal from at least one of the one or more imaging apparatuses.

7. The imaging system according to claim 1, wherein the first communication means is a wireless optical communication unit.

8. The imaging system according to claim 1, wherein at least one of the one or more imaging apparatuses further comprises third communication means for performing data communication with an external server apparatus,
wherein the control means controls the third communication means to transmit the saved captured image data and identification information to the external server apparatus.

9. The imaging system according to claim 1, wherein the imaging means includes a charge-coupled device sensor or a complementary metal-oxide semiconductor sensor serving as an image pickup device.

10. The imaging system according to claim 1, wherein the second communication means is a wireless optical communication unit.

11. The imaging system according to claim 1, wherein the control means causes, in a case where the notification data received by the second communication means includes the image request signal and the identification information of the imaging instruction issuing apparatus serving as the transmission source of the notification data, the saving means to save the captured image data obtained by the imaging means and to save the identification information in association with the captured image data.

12. The imaging system according to claim 1, wherein the control means causes the saving means to save the captured image data representing a continuous moving image or periodical still images and, as the saving process performed in the case where the notification data received by the second communication means includes the image request signal and the identification information of the imaging instruction issuing apparatus serving as the transmission source of the notification data, performs marking control of a point of the saved captured image data corresponding to the identification information.

13. The imaging system according to claim 1, wherein the control means prohibits the saving process from saving the captured image data when the image request signal in the notification data received by the communication means indicates that imaging is prohibited.

14. The imaging system according to claim 1, wherein the control means recognizes a position of the subject based, at least in part, on position information included in the notification data received by the second communication means.

15. The imaging system according to claim 1, wherein at least one of the one or more imaging apparatuses further comprises encryption means for performing an encryption process of encrypting the captured image data obtained by the imaging means using information used for encryption, the information being included in the notification data received by the second communication means.

16. An imaging system comprising:
an imaging instruction issuing apparatus; and
one or more imaging apparatuses,
wherein the imaging instruction issuing apparatus includes:
- at least one storage device to store an image capturing request code and an image capturing prohibition code;
- an input unit configured to receive from a user, an indication of whether to transmit the image capturing request code or the image capturing prohibition code;
- a setting unit to set an image request signal in accordance with the indication received by the inputting means, wherein setting the image request signal comprises retrieving from the at least one storage device, the image capturing request code or the image capturing prohibition code in accordance with the indication;
- a generation unit to generate notification data including the image request signal and identification information identifying the imaging instruction issuing apparatus, and
- a first communication unit to transmit and output the notification data to the one or more imaging apparatuses, and wherein the one or more imaging apparatuses each include
- an imaging unit to obtain captured image data of a subject,
- a saving unit to save the captured image data obtained by the imaging unit,
- a second communication unit to receive the notification data from the imaging instruction issuing apparatus, and
- a control unit to cause the saving unit to perform a saving process of saving the captured image data obtained by the imaging unit and the identification information included in the notification data in an associated manner when the image request signal in the notification data received by the second communication unit includes the image capturing request code.

* * * * *